(12) United States Patent
Li et al.

(10) Patent No.: US 6,597,703 B1
(45) Date of Patent: Jul. 22, 2003

(54) SYSTEM, DEVICE, AND METHOD FOR REDUCING MULTICAST FORWARDING STATES IN A MULTICAST COMMUNICATION SYSTEM

(75) Inventors: Yunzhou Li, Lowell, MA (US); Shuching Shieh, Nashua, NH (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/450,100

(22) Filed: Nov. 29, 1999

(51) Int. Cl.$^7$ .............................................. H04L 12/56
(52) U.S. Cl. ...................................... 370/428; 370/432
(58) Field of Search ................................. 370/254, 255, 370/389, 390, 392, 393, 395.3, 395.31, 428, 429, 432

(56) References Cited

U.S. PATENT DOCUMENTS 5,517,494 A * 5/1996 Green .......................... 370/408
5,959,989 A * 9/1999 Gleeson et al. ............. 370/390
6,331,983 B1 * 12/2001 Haggerty et al. ........... 370/400

OTHER PUBLICATIONS

Deering, et al., "A taxonomy of multicast security issues", The Internet Engineering Task Force(www.ietf.org), Internet–Draft, Jun. 7, 1999.

Estrin, et al., "Protocol Independent Multicast–Sparse Mode (PIM–SM): Protocol Specification." The Internet Engineering Task Force(www.ietf.org), Request for Comments, Jun. 1998.

* cited by examiner

*Primary Examiner*—Kwang Bin Yao
(74) *Attorney, Agent, or Firm*—Steubing McGuinness & Manaras LLP

(57) ABSTRACT

A system, device, and method for reducing multicast forwarding states in a multicast communication system maintains forwarding states in such a way that the non-default forwarding states have non-overlapping source address ranges. Each forwarding state is associated with a source address range encompassing one or more source addresses. When a non-default forwarding state is installed, the source address range for the forwarding state is selected so that the source address range does not overlap with the source address ranges of any other non-default forwarding states. The source address range for a particular forwarding state may be adjusted as new routes are learned or existing routes are changed or aged.

97 Claims, 26 Drawing Sheets

SYSTEM, DEVICE, AND METHOD FOR REDUCING MULTICAST FORWARDING STATES IN A MULTICAST COMMUNICATION SYSTEM

FIELD OF THE INVENTION

The present invention relates generally to communication systems, and more particularly to reducing multicast forwarding states in a multicast communication system.

BACKGROUND OF THE INVENTION

In today's information age, communication networks are often used for transporting information from an information provider to one or more information consumers. One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through a number of multicast routers. For convenience, the path through the various multicast routers is referred to as the "multicast distribution tree" for the (S,G) pair. The multicast routers utilize various multicast routing protocols, such as Multicast Open Shortest-Path First (MOSPF), Distance Vector Multicast Routing Protocol (DVMRP), Protocol Independent Multicast (PIM), or Multicast Border Gateway Protocol (MBGP), in order to determine the multicast distribution tree for the (S,G) pair.

More specifically, a router runs multicast routing protocols in order to determine multicast routing information. The router maintains the multicast routing information in a routing table called a Multicast Routing Information Base (MRIB). The DVMRP routing table and the-MBGP routing table are examples of a MRIB. For multicast routing protocols such as MOSPF and PIM that do not inherently utilize a multicast routing table, the unicast routing table is used as the MRIB. Each interface may have a separate MRIB.

Using the multicast routing information in the MRIB(s), the router sets up multicast forwarding states that define how the router forwards multicast packets. These multicast forwarding states are maintained by a Multicast Table Manager (MTM) in a multicast forwarding table. Each multicast forwarding entry in the multicast forwarding table corresponds to a particular (S,G) pair, and defines the inbound and outbound interfaces for the (S,G) pair.

Some multicast routing protocols, such as PIM, allow the router to forward multicast packets from any multicast source to a particular multicast group G. Such a multicast forwarding state is designated a (*,G) forwarding state. As with any other (S,G) pair, the MTM maintains a multicast forwarding entry for the (*,G) forwarding state. For convenience, a multicast forwarding entry for the (*,G) state is referred to hereinafter as a "default" multicast forwarding entry, while other multicast forwarding entries are referred to hereinafter as "non-default" multicast forwarding entries.

Each multicast forwarding entry includes, among other things, an inbound list indicating the accepted (preferred) and rejected inbound interfaces for the (S,G) pair and an outbound list indicating the outbound interfaces for the (S,G) pair. If a particular (S,G) pair has multiple accepted (preferred) inbound interfaces, particularly due to different multicast routing protocols running on different interfaces, the MTM determines a most-preferred inbound interface from among the accepted (preferred) inbound interfaces. In order to support certain multicast routing protocols, such as PIM, each outbound interface in the outbound list may be associated with a source list indicating the multicast sources that are associated with the outbound interface.

When the router receives a multicast packet for (S,G) from a particular interface, the router searches the multicast forwarding table for a corresponding multicast forwarding entry and processes the multicast packet accordingly. In a typical multicast communication network, it is common for a multicast forwarding table to have a large number of multicast forwarding entries. The large number of multicast forwarding entries makes the multicast forwarding table very large, and also makes searching the multicast forwarding table for the multicast forwarding entry a relatively time-consuming operation.

Thus, a need has remained for a technique that reduces the number of multicast forwarding states in a multicast routing device, and more particularly for a technique that reduces the number of multicast forwarding entries in the multicast forwarding table.

SUMMARY OF THE INVENTION

In accordance with one aspect of the invention, forwarding states are maintained in such a way that all non-default forwarding states are non-overlapping.

In accordance with another aspect of the invention, a prefix is assigned to each forwarding state. The source address S and the prefix together define the source address range for the forwarding state. The prefix is assigned in such a way that the source address range defined by S/prefix does not overlap with the source address ranges of any other non-default forwarding state.

In accordance with yet another aspect of the invention, a non-overlapping prefix is determined by finding an enclosing range for S (the matching range) that contains a number of more-specific enclosing ranges, where each enclosing range is characterized by a lower boundary and an upper boundary; determining a maximum upper boundary within the matching range that is less than or equal to S; determining a minimum lower boundary within the matching range that is greater than or equal to S; and determining the minimum prefix such that the lower boundary of the source address range defined by S/prefix is greater than or equal to the maximum upper boundary and the upper boundary of the source address range defined by S/prefix is less than or equal to the minimum lower boundary.

In accordance with still another aspect of the invention, a the source address range of a fowarding state is adjusted when a new route is detected or an existing route changes or is aged.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
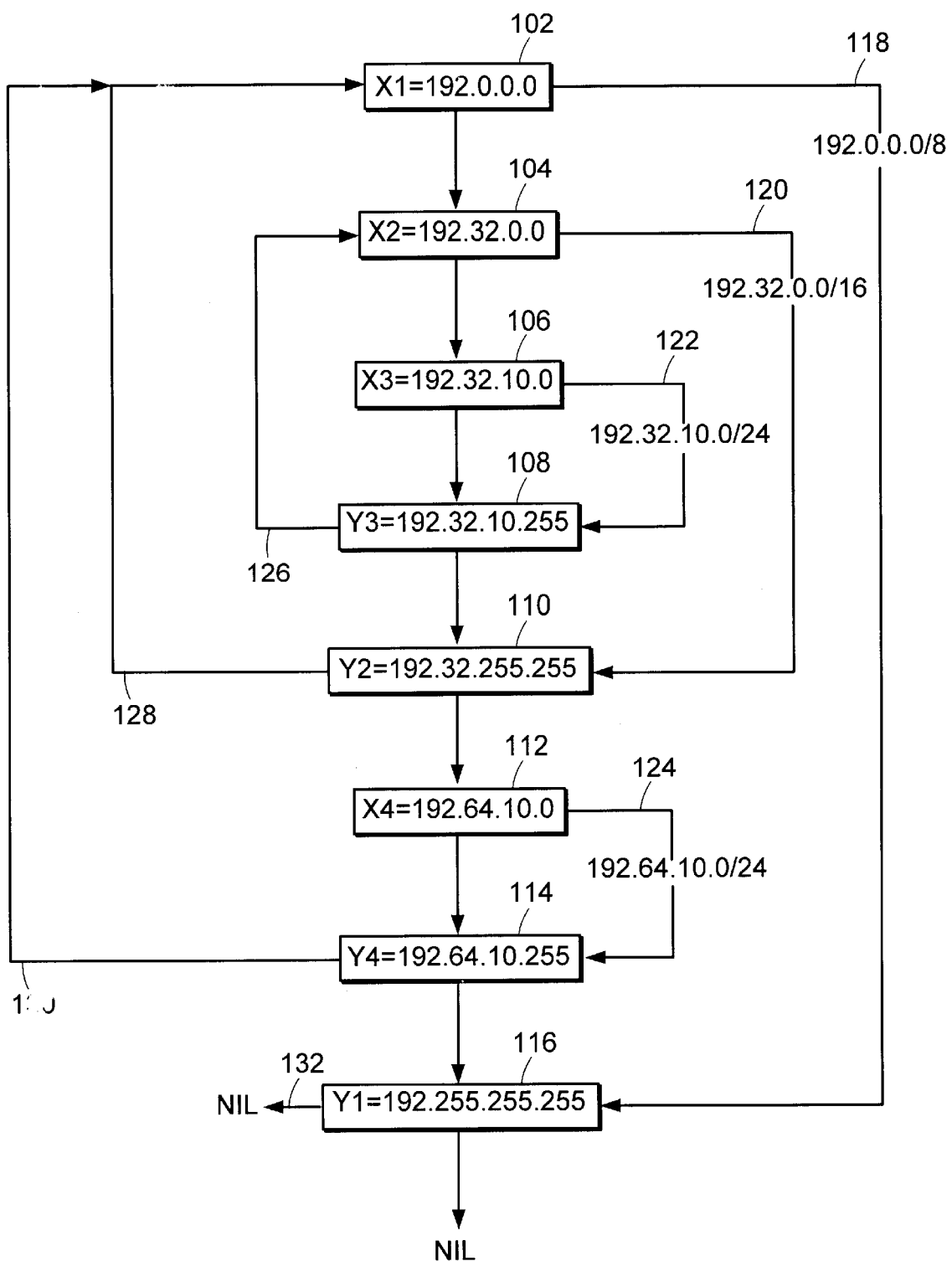
FIG. 1 shows an exemplary multicast routing information base in the form of a R table including multi-level enclosing ranges in accordance with an embodiment of the invention.

An embodiment of the present invention reduces the number of forwarding states by maintaining forwarding states in such a way that the non-default forwarding states have non-overlapping source address ranges. Specifically, each forwarding state is associated with a source address range encompassing one or more source addresses. Each forwarding state provides forwarding information for any source address that falls within the corresponding source address range. The source address range for a particular forwarding state may be adjusted as new routes are learned or existing routes are changed or aged.

In a preferred embodiment of the invention, each forwarding entry is associated with a prefix, and is denoted hereinafter as a (S/prefix,G) state. The prefix defines the number of significant source address bits for matching the (S/prefix,G) state, and therefore S/prefix defines the source address range. In a preferred embodiment, source addresses are 32 bits long, and the prefix is a value from zero (0) to 32, inclusive, where a prefix of zero (0) defines the least-specific source address range that includes all source addresses (i.e., the default source address range), and a prefix of 32 defines the most-specific source address range that includes only the source address S. Each interface may determine an individual prefix for the same source, and therefore the association of source with prefix in this context is not equivalent to the similar use of a prefix to define source subnets generally (although S/prefix does define a source subnet relative to the particular interface). The prefix for a particular non-default (S/prefix,G) state is selected such that the source address range defined by S/prefix does not overlap with any other non-default source address range. As new routes are learned or existing routes are changed or aged, a (S/prefix,G) state may be re-prefixed to use a longer (i.e., more specific) prefix.

The prefix essentially defines a mask that determines the source address range R for a particular (S/prefix,G) state. Using conventions of the C programming language, the mask is equal to ~(0xFFFFFFFF>>prefix). The source address range R includes all source addresses A such that the value (A & mask) is equal to the value (S & mask). Thus, for a prefix of sixteen (16), the mask is equal to 0xFFFF0000 and the source address range R includes all source addresses A from 0xSSSS0000 through 0xSSSSFFFF, where SSSS is the high-order sixteen (16) bits of the source address S.

The selection of a prefix is based upon the principle that a source address range R1 is contained in a source address range R2 if and only if there is at least one source address A that is common to both R1 and R2 and the prefix associated with R2 is less than or equal to the prefix associated with R1. Assuming the source address range R1 is defined by S1/prefix 1 and the source address range R2 is defined by S2/prefix 2, then it can be shown that all source addresses in the source address range R1 are contained in the source address range R2 if and only there is at least one source address A that is in both R1 and R2 and prefix 2 is less than or equal to prefix 1. Specifically, since a larger prefix defines a smaller source address range (i.e., a source address range with fewer source addresses) than a smaller prefix, it would only be possible for all source addresses in the source address range R1 to be contained in the source address range R2 if and only if prefix 2 is less than or equal to prefix 1. Furthermore, in order for a particular source address A to be in both R1 and R2, (A & mask1) must be equal to (A & mask2), where mask1 is equal to ~(0xFFFFFFFF>>prefix 1) and mask2 is equal to (0xFFFFFFFF>>prefix 2). Since A is in the source address range R1, (A & mask1) is equal to (S1 & mask1). Likewise, since A is also in the source address range R2, (A & mask2) is equal to (S2 & mask2). Thus, assuming the source address ranges R1 and R2 overlap (i.e., have at least one source address in common), the source address range R1 is contained in the source address range R2 if and only if prefix 2 is less than or equal to prefix 1.

In a preferred embodiment of the present invention, the MRIB is implemented as a R table that supports multi-level enclosing ranges (R tables are well-known in the art).

FIG. 1 shows an exemplary MRIB in the form of a R table including multi-level enclosing ranges. The pointers show the various enclosing ranges.

The enclosing range of a lower boundary is the corresponding upper boundary of the range. The enclosing range for the lower boundary x1 (102) is the corresponding upper boundary y1 (116), as shown by the pointer 118. The enclosing range for the lower boundary x2 (104) is the corresponding upper boundary y2 (110), as shown by the pointer 120. The enclosing range for the lower boundary x3 (106) is the corresponding upper boundary y3 (108), as shown by the pointer 122. The enclosing range for the lower boundary x4 (112) is the corresponding upper boundary y4 (114), as shown by the pointer 124.

The enclosing range of an upper boundary is the lower boundary of its less-specific range. The enclosing range for the upper boundary y3 (108) is the lower boundary x2 (104), as shown by the pointer 126. The enclosing range for the upper boundary y2 (110) is the lower boundary x1 (102), as shown by the pointer 128. The enclosing range for the upper boundary y4 (114) is the lower boundary x1 (102), as shown by the pointer 130. The enclosing range for the upper boundary y1 (116) is nil, as shown by the pointer 132, since there is no less-specific range associated with the upper boundary y1 (116).

The router selects a prefix for a particular (S,G) pair by finding the most-specific range in the MRIB that includes S (i.e., the matching range) and determining the minimum prefix for S such that S/prefix does not overlap with any more specific range(s) within the matching range. If the matching range does not include any more specific range(s), then S can use the prefix associated with the matching range.

Figure 2:
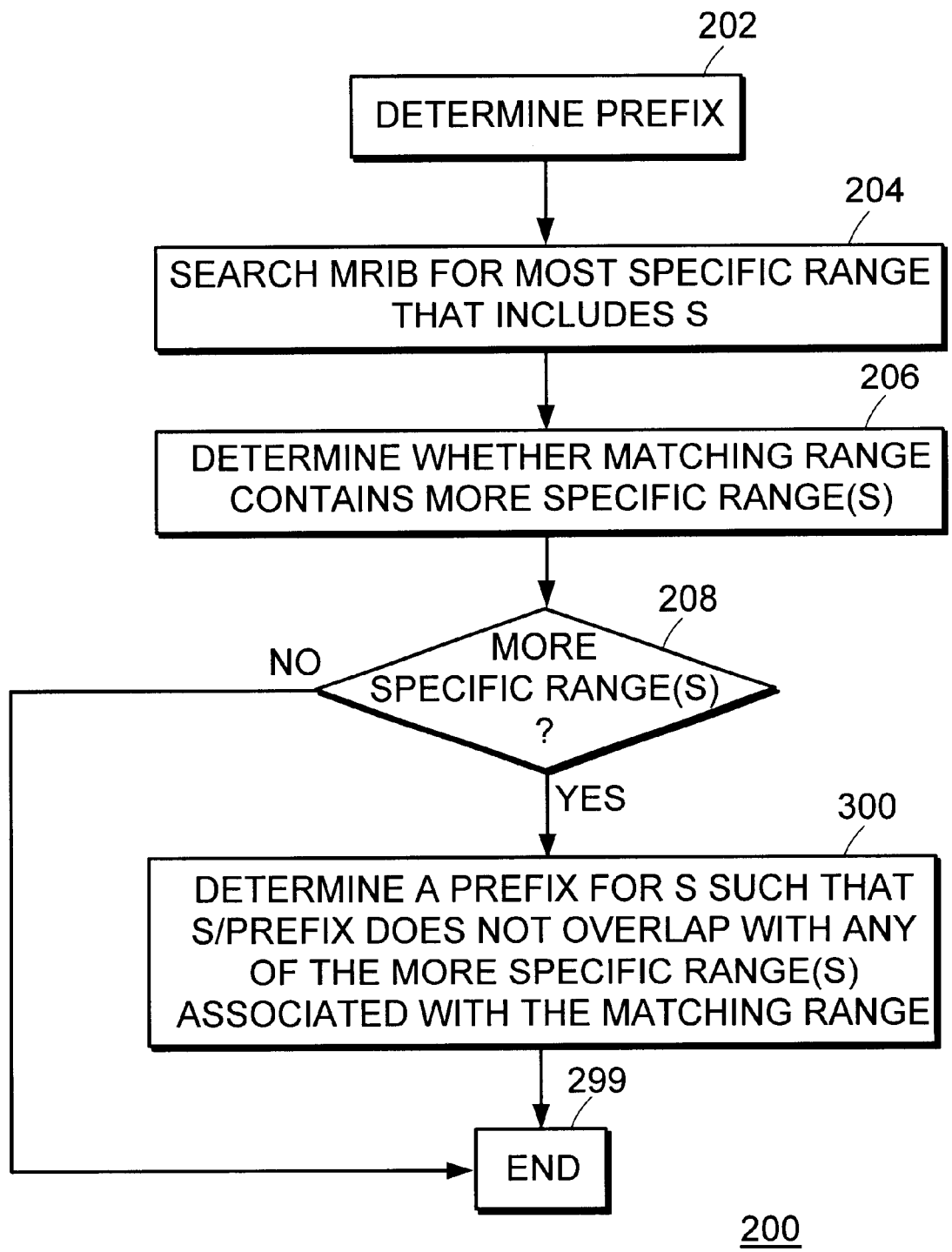
FIG. 2 is a logic flow diagram showing exemplary logic for determining a non-overlapping prefix for a source address S in accordance with an embodiment of the invention.

FIG. 2 is a logic flow diagram showing exemplary logic 200 for determining a prefix for S. Beginning in step 202, the logic searches the MRIB for the most-specific range that includes S, in step 204. The logic then determines whether the matching range contains more specific range(s), in step 206. If the matching range contains more specific range(s) (YES in step 208), then the logic determines a prefix for S such that S/prefix does not overlap with any of the more specific range(s) associated with the matching range using the logic 300 as shown and described with reference to FIG. 3. Otherwise (NO in step 208), S can use the prefix associated with the matching range, since S/prefix does not overlap with any range. The logic 200 terminates in step 299.

Figure 3:
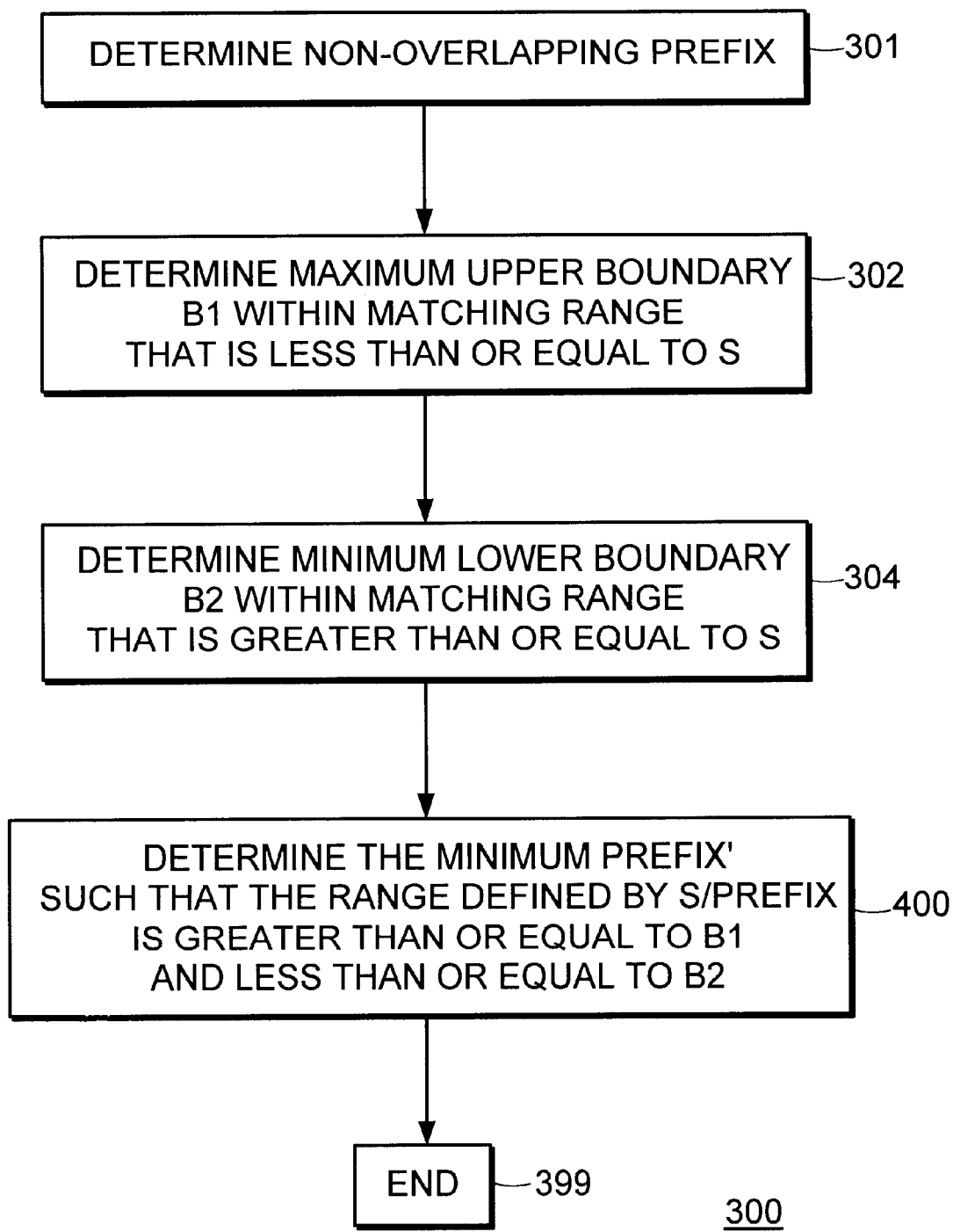
FIG. 3 is a logic flow diagram showing exemplary logic for determining a minimum non-overlapping prefix for a source address S in accordance with an embodiment of the invention.

FIG. 3 is a logic flow diagram showing exemplary logic 300 for determining the non-overlapping prefix. Beginning at step 301, the logic determines the maximum upper boundary B1 within the matching range that is less than or equal to S, in step 302. The logic also determines the minimum lower boundary B2 within the matching range that is greater than or equal to S, in step 304. The logic then determines the minimum prefix such that the range defined by S/prefix is greater than or equal to the maximum upper boundary B1 and is less than or equal to the minimum lower boundary B2 using the logic 400 as shown and described with reference to FIG. 4. The logic 300 terminates in step 399.

Figure 4:
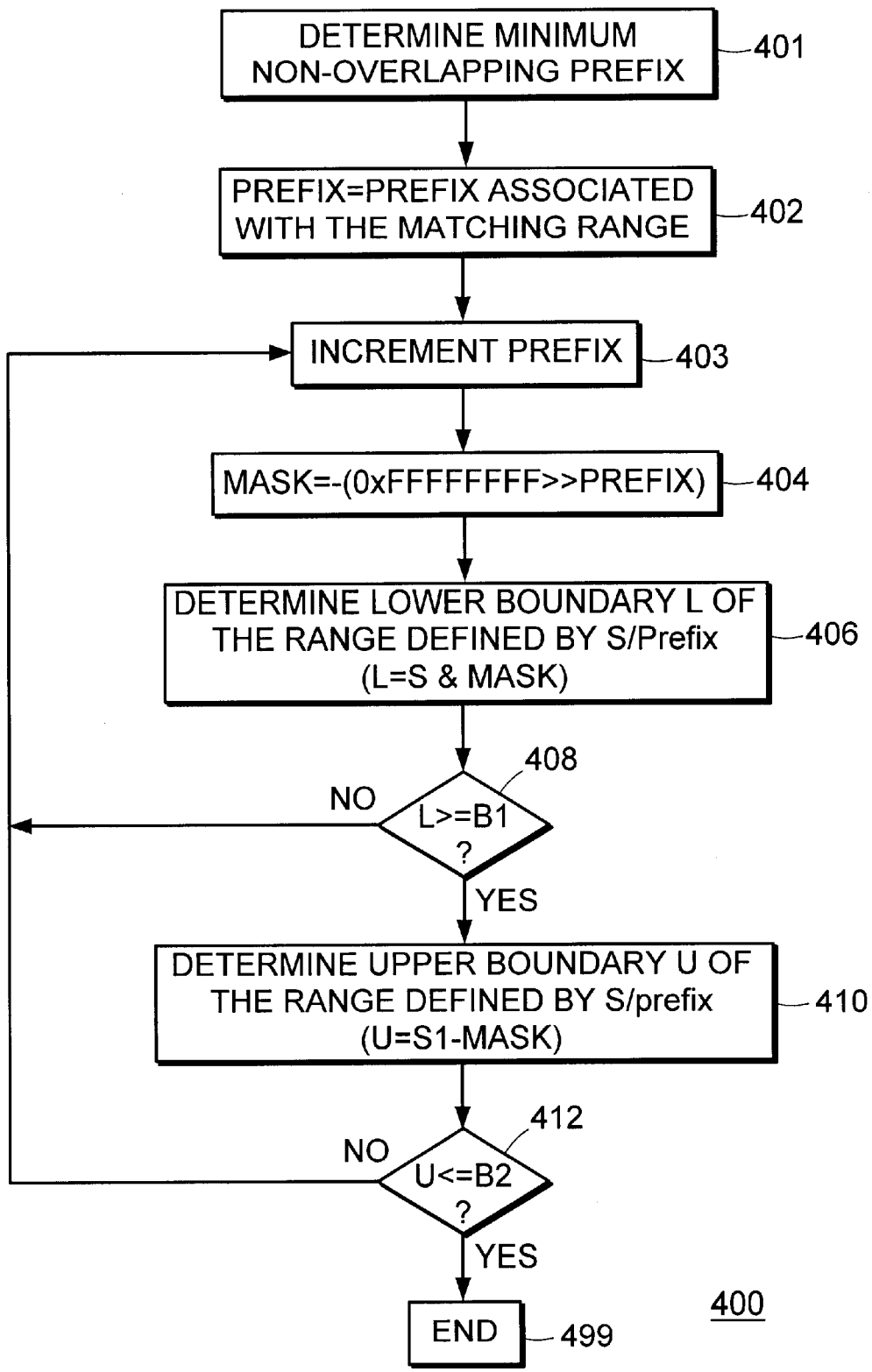
FIG. 4 is a logic flow diagram showing an exemplary iterative technique for determining the minimum non-overlapping prefix for the source address S in accordance with an embodiment of the invention.

FIG. 4 is a logic flow diagram showing exemplary logic 400 for determining the minimum non-overlapping prefix. Beginning at step 401, the logic first sets the prefix equal to the prefix associated with the matching range, in step 402, and then proceeds to a first iteration of the logic. In each iteration, the logic increments the prefix, in step 403, and determines the corresponding mask equal to the value ~(0xFFFFFFFF>>prefix), in step 404. The logic then determines the lower boundary L of the range defined by S/prefix, which is equal to (S & mask), in step 406. It should be noted that the lower boundary L is equal to S, but with the insignificant address bits set to zero (0). The logic then determines whether the lower boundary L is greater than or equal to the maximum upper boundary B1, in step 408. If the lower boundary L is not greater than or equal to the maximum upper boundary B1 (NO in step 408), then the logic recycles to step 403 for a next iteration. If the lower boundary L is greater than or equal to the maximum upper boundary B1 (YES in step 408), then the logic proceeds to determine the upper boundary U of the range defined by S/prefix, which is equal to (S|~mask), in step 410. It should be noted that the upper boundary U is equal to S, but with the insignificant address bits set to one (1). The logic then determines whether the upper boundary U is less than or equal to the minimum lower boundary B2, in step 412. If the upper boundary U is not less than or equal to the minimum lower boundary B2 (NO in step 412), then the logic recycles to step 403 for a next iteration. If the upper boundary U is less than or equal to the minimum lower boundary B2 (YES in step 412), then the logic 400 terminates in step 499, having found the minimum non-overlapping prefix for S.

Certain elements of the present invention can be demonstrated by an example that determines a prefix for a source address S equal to the address 192.33.0.1 based upon the source address ranges shown in FIG. 1. The logic first searches the MRIB for the most-specific range that includes S, which, in this example, is the range 192.0.0.0/8 (118) with lower boundary x1 (102) and upper boundary y1 (116). Because the matching range includes more specific ranges, specifically the ranges 192.32.0.0/16 (120), 192.32.10.0/24 (122), and 192.64.10.0/24 (124), the source address S cannot use the prefix of eight (8) that is associated with the matching entry. Therefore, the logic proceeds to determine the maximum upper boundary B1 within the matching range that is less than or equal to S, which, in this example, is the upper boundary y2 (110). The logic also determines the minimum lower boundary B2 within the matching range that is greater than or equal to S, which, in this example, if the lower boundary x4 (112). In other words, the source address S is between the source address range 192.32.0.0/16 (120), with lower boundary x2 (104) and upper boundary y2 (110), and the source address range 192.64.10.0/24, with lower boundary x4 (112) and upper boundary y4 (114).

Having found the maximum upper boundary B1 and the minimum lower boundary B2, the logic then determines the minimum prefix such that the range defined by S/prefix is greater than or equal to the maximum upper boundary B1 and is less than or equal to the minimum lower boundary B2. Specifically, the logic determines, for a particular prefix value, the lower boundary L of the range defined by S/prefix and the upper boundary U of the range defined by S/prefix. The logic determines the minimum prefix value such that the lower boundary L is greater than or equal to B1 and the upper boundary U is less than or equal to B2. This can be done, for example, using an iterative process as shown and described with reference to FIG. 4, beginning with a prefix equal to the prefix associated with the matching range and incrementing the prefix each iteration.

In order to demonstrate the iterative process for finding a prefix for the source address S in this example, it is convenient to show the various addresses in binary form. The significant address bits for masked values are shown underlined.

The values B1, B2, and S are respectively:

| | | | | |
|---|---|---|---|---|
| B1 = y2 = 192.32.255.255 = | 11000000 | 00100000 | 11111111 | 11111111 |
| B2 = x4 = 192.64.10.0 = | 11000000 | 01000000 | 00001010 | 00000000 |
| S = 192.33.0.1 = | 11000000 | 00100001 | 00000000 | 00000001 |

Using a prefix of nine (9), the lower boundary L and the upper boundary U of the range defined by S/prefix are respectively:

| | | | | |
|---|---|---|---|---|
| L/9 = | 11000000 | 00000000 | 00000000 | 00000000 |
| U/9 = | 11000000 | 01111111 | 11111111 | 11111111 |

Here, the lower boundary L is less than B1 and the upper boundary U is greater than B2, so the source address range defined by S/9 overlaps both the source address range 192.32.0.0/16 (120), with lower boundary x2 (104) and upper boundary y2 (110), and the source address range 192.64.10.0/24, with lower boundary x4 (112) and upper boundary y4 (114).

Using a prefix of ten (10), the lower boundary L and the upper boundary U of the range defined by S/prefix are respectively:

| | | | | |
|---|---|---|---|---|
| L/10 = | 11000000 | 00000000 | 00000000 | 00000000 |
| U/10 = | 11000000 | 00111111 | 11111111 | 11111111 |

Here, the lower boundary L is less than B1 and the upper boundary U is less than B2, so the source address range defined by S/10 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of eleven (11), the lower boundary L and the upper boundary U of the range defined by S/prefix are respectively:

| | | | | |
|---|---|---|---|---|
| L/11 = | 11000000 | 00100000 | 00000000 | 00000000 |
| U/11 = | 11000000 | 00111111 | 11111111 | 11111111 |

Here, the lower boundary L is less than B1 and the upper boundary U is less than B2, so the source address range defined by S/11 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of twelve (12), the lower boundary L and the upper boundary U of the range defined by S/prefix are respectively:

| | | | | |
|---|---|---|---|---|
| L/12 = | 11000000 | 00100000 | 00000000 | 00000000 |
| U/12 = | 11000000 | 00101111 | 11111111 | 11111111 |

Here, the lower boundary L is less than B1 and the upper boundary U is less than B2, so the source address range defined by S/12 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of thirteen (13), the lower boundary L and the upper boundary U of the range defined by S/prefix are respectively:

| | | | | |
|---|---|---|---|---|
| L/13 = | 11000000 | 00100000 | 00000000 | 00000000 |
| U/13 = | 11000000 | 01000111 | 11111111 | 11111111 |

Here, the lower boundary L is less than B1 and the upper boundary U is less than B2, so the source address range defined by S/13 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of fourteen (14), the lower boundary L and the upper boundary U of the range defined by S/prefix are respectively:

| L/14 = | 11000000 | 00100000 | 00000000 | 00000000 |
| U/14 = | 11000000 | 00100011 | 11111111 | 11111111 |

Here, the lower boundary L is less than B1 and the upper boundary U is less than B2, so the source address range defined by S/14 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of fifteen (15), the lower boundary L and the upper boundary U of the range defined by S/prefix are respectively:

| L/15 = | 11000000 | 00100000 | 00000000 | 00000000 |
| U/15 = | 11000000 | 00100001 | 11111111 | 11111111 |

Here, the lower boundary L is less than B1 and the upper boundary U is less than B2, so the source address range defined by S/15 overlaps the source address range 192.32.0.0/16 (120), with lower boundary x2 (104) and upper boundary y2 (110), but not the source address range 192.64.10.0/24, with lower boundary x4 (112) and upper boundary y4 (114).

Using a prefix of sixteen (16), the lower boundary L and the upper boundary U of the range defined by S/prefix are respectively:

| L/16 = | 11000000 | 00100001 | 00000000 | 00000000 |
| U/16 = | 11000000 | 00100001 | 11111111 | 11111111 |

Here, the lower boundary L is greater than B1 and the upper boundary U is less than B2, so the source address range defined by S/16 does not overlap either the source address range 192.32.0.0/16 (120), with lower boundary x2 (104) and upper boundary y2 (110), or the source address range 192.64.10.0/24, with lower boundary x4 (112) and upper boundary y4 (114).

Therefore, a prefix of sixteen (16) is the minimum prefix for S such that the range defined by S/prefix is non-overlapping within the matching range.

As new routes are learned or existing routes are changed or aged, a (S/prefix,G) state may be re-prefixed to use a longer (i.e., more specific) prefix.

When the router learns a new route (NewRoute), the router locates all forwarding entries (S/prefix,G) such that the source address range defined by S/prefix is contained in the NewRoute. For each such forwarding entry, the router searches the MRIB for S and determines whether S is contained in a more specific range other than NewRoute. If S is contained in a more specific route other than NewRoute, then the router makes no change to the forwarding entry. If S is not contained in a more specific route other than NewRoute, then the router determines whether the NewRoute causes the inbound interface to change from an old inbound interface to a new inbound interface. If the NewRoute does not cause the inbound interface to change from an old inbound interface to a new inbound interface, then the router makes no change to the forwarding entry. If the NewRoute causes the inbound interface to change from an old inbound interface to a new inbound interface, then the router updates the (S/prefix,G) inbound and outbound interfaces.

Specifically, in order to update the (S/prefix,G) inbound and outbound interfaces, the router sets the old inbound interface to rejected, sets the new inbound interface to preferred, and determines the most preferred inbound interface from among the preferred inbound interfaces using a predetermined priority scheme. It should be noted that the new inbound interface may or may not be the most preferred inbound interface. The router also determines whether the new inbound interface was previously an outbound interface for (S/prefix,G), and deletes the new inbound interface from the (S/prefix,G) outbound list if the new inbound interface was previously an outbound interface for (S/prefix,G). Furthermore, the router determines whether the old inbound interface is now an outbound interface for (S/prefix,G), and adds the old inbound interface to the (S/prefix,G) outbound list if the old inbound interface is now an outbound interface for (S/prefix,G).

After processing each of the (S/prefix,G) forwarding entries that are contained in the NewRoute, as described above, the router searches the forwarding table for a (S/prefix,G) forwarding entry that is less specific compared to the NewRoute. Assuming such a (S/prefix,G) forwarding entry is found, the router determines whether S is in the NewRoute. If S is not in the NewRoute, then the router determines a new prefix (NewPrefix) for S such that S/NewPrefix does not overlap with NewRoute, and re-prefixes the forwarding entry to (S/NewPrefix,G). If S is in the NewRoute, then the router re-prefixes the forwarding entry with a new prefix (NewPrefix) set to the prefix associated with the NewRoute, determines the next hop interface toward NewRoute, and updates the (S/NewPrefix,G) inbound and outbound interfaces.

Specifically, in order to update the (S/NewPrefix,G) inbound and outbound interfaces, the router sets the old inbound interface to rejected, sets the new inbound interface (i.e., the next hop interface toward NewRoute) to preferred, and determines the most preferred inbound interface from among the preferred inbound interfaces using a predetermined priority scheme. It should be noted that the new inbound interface may or may not be the most preferred inbound interface. The router also determines whether the new inbound interface was previously an outbound interface for (S/NewPrefix,G), and deletes the new inbound interface from the (S/NewPrefix,G) outbound list if the new inbound interface was previously an outbound interface for (S/NewPrefix,G). Furthermore, the router determines whether the old inbound interface is now an outbound interface for (S/NewPrefix,G), and adds the old inbound interface to the (S/NewPrefix,G) outbound list if the old inbound interface is now an outbound interface for (S/NewPrefix,G).

Figure 5:
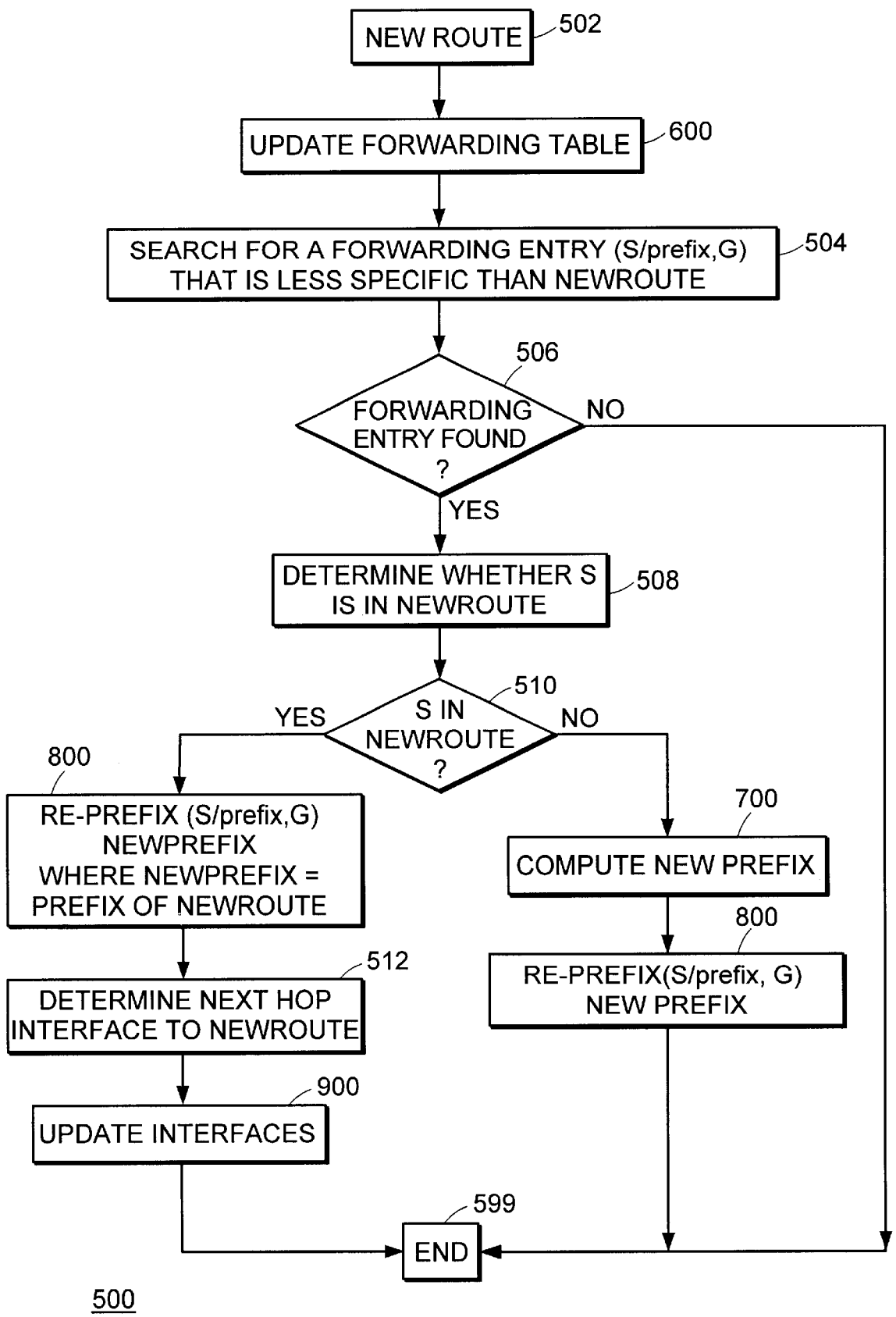
FIG. 5 is a logic flow diagram showing exemplary logic for processing a new multicast route in accordance with an embodiment of the invention.

FIG. 5 shows exemplary logic 500 for processing a new route. Beginning at step 502, and upon learning a new route (NewRoute), the logic proceeds to update the forwarding table using the logic 600 shown and described with reference to FIG. 6. Specifically, the logic locates all forwarding entries (S/prefix,G) such that the source address range defined by S/prefix is contained in the NewRoute. For each such forwarding entry, the logic searches the MRIB for S and determines whether S is contained in a more specific route other than NewRoute. If S is contained in a more specific route other than NewRoute, then the logic makes no change to the forwarding entry. If S is not contained in a more specific route other than NewRoute, then the logic determines whether the NewRoute causes the inbound interface to change from an old inbound interface to a new inbound interface. If the NewRoute does not cause the inbound interface to change from an old inbound interface to a new inbound interface, then the logic makes no change to the forwarding entry. If the NewRoute causes the inbound interface to change from an old inbound interface to a new inbound interface, then the logic updates the (S/prefix,G) inbound and outbound interfaces.

Figure 6:
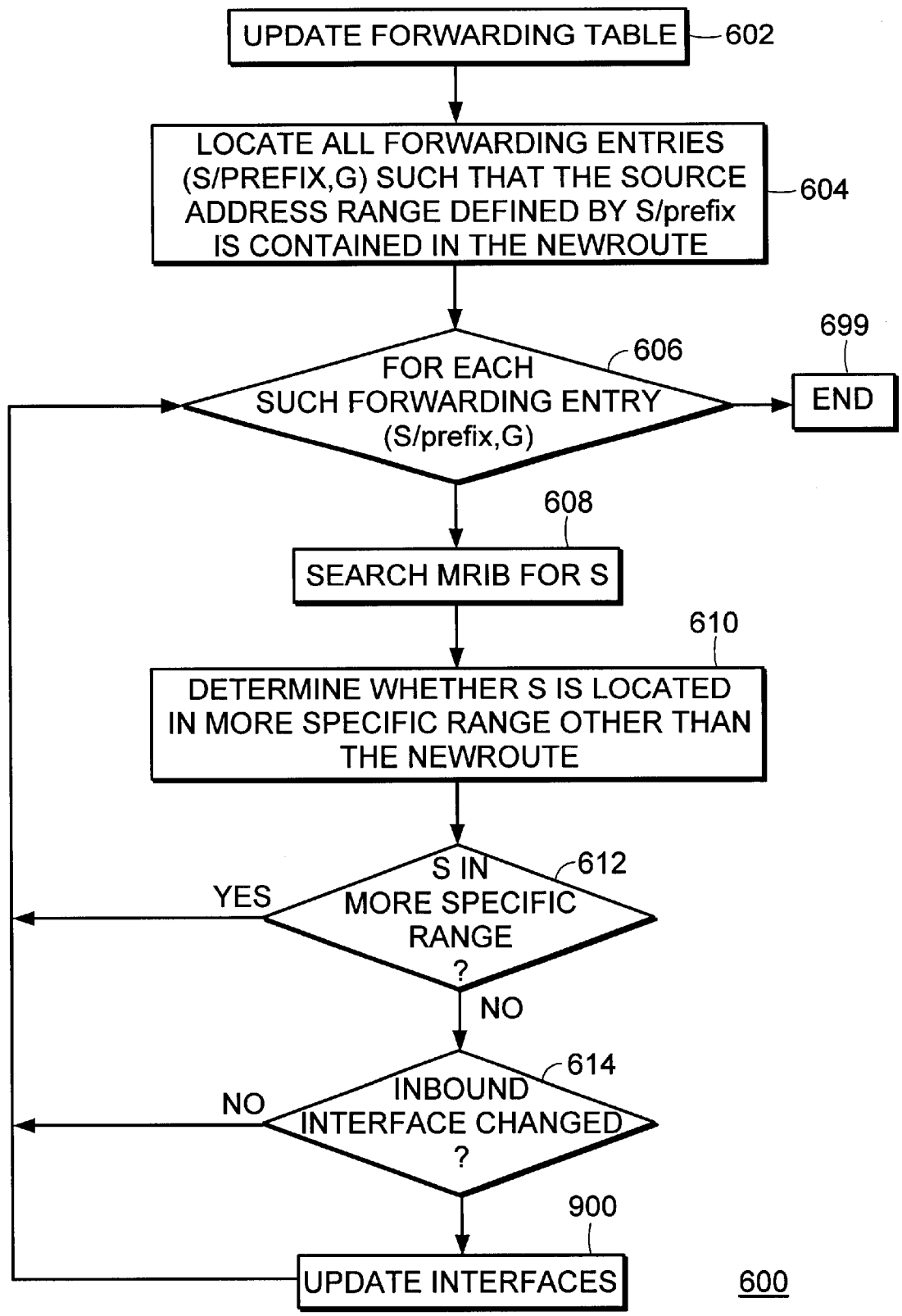
FIG. 6 is a logic flow diagram showing exemplary logic for updating the forwarding table in accordance with an embodiment of the invention.

FIG. 6 shows exemplary logic 600 for updating the forwarding table. Beginning at step 602, the logic locates all forwarding entries (S/prefix,G) such that the source address range defined by S/prefix is contained in the NewRoute, in step 604. For each such forwarding entry, the logic searches the MRIB for S, in step 608, and determines whether S is contained in a more specific range other than NewRoute, in step 610. If S is contained in a more specific route other than NewRoute (YES in step 612), then the logic makes no change to the forwarding entry, in which case the logic recycles to step 606 to process another forwarding entry. If S is not contained in a more specific route other than NewRoute (NO in step 612), then the logic determines whether the NewRoute causes the inbound interface to change from an old inbound interface to a new inbound interface, in step 614. If the NewRoute does not cause the inbound interface to change from an old inbound interface to a new inbound interface (NO in step 614), then the logic makes no change to the forwarding entry, in which case the logic recycles to step 606 to process another forwarding entry. If the NewRoute causes the inbound interface to change from an old inbound interface to a new inbound interface (YES in step 614), then the logic updates the (S/prefix,G) inbound and outbound interfaces using the logic 900 shown and described with reference to FIG. 9. After processing each such forwarding entry, the logic 600 terminates in step 699.

Figure 9:
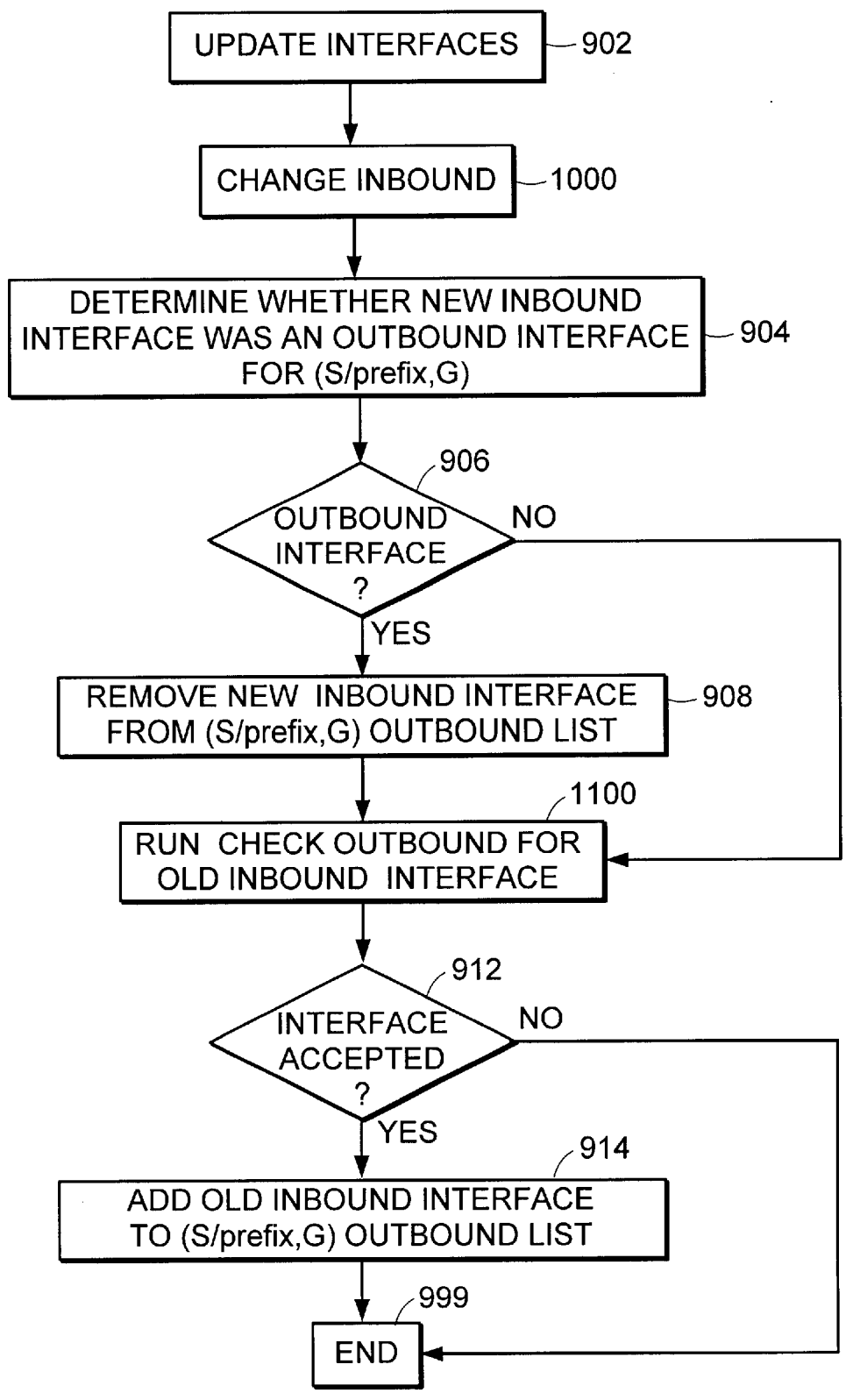
FIG. 9 is a logic flow diagram showing exemplary logic for updating inbound and outbound interfaces for a forwarding state in accordance with an embodiment of the invention.

FIG. 9 shows exemplary logic 900 for updating the inbound and outbound interfaces for a (S/prefix,G) forwarding entry. Beginning at step 902, the logic first changes the (S/prefix,G) inbound interface using the logic 1000 as shown and described with reference to FIG. 10.

Figure 10:
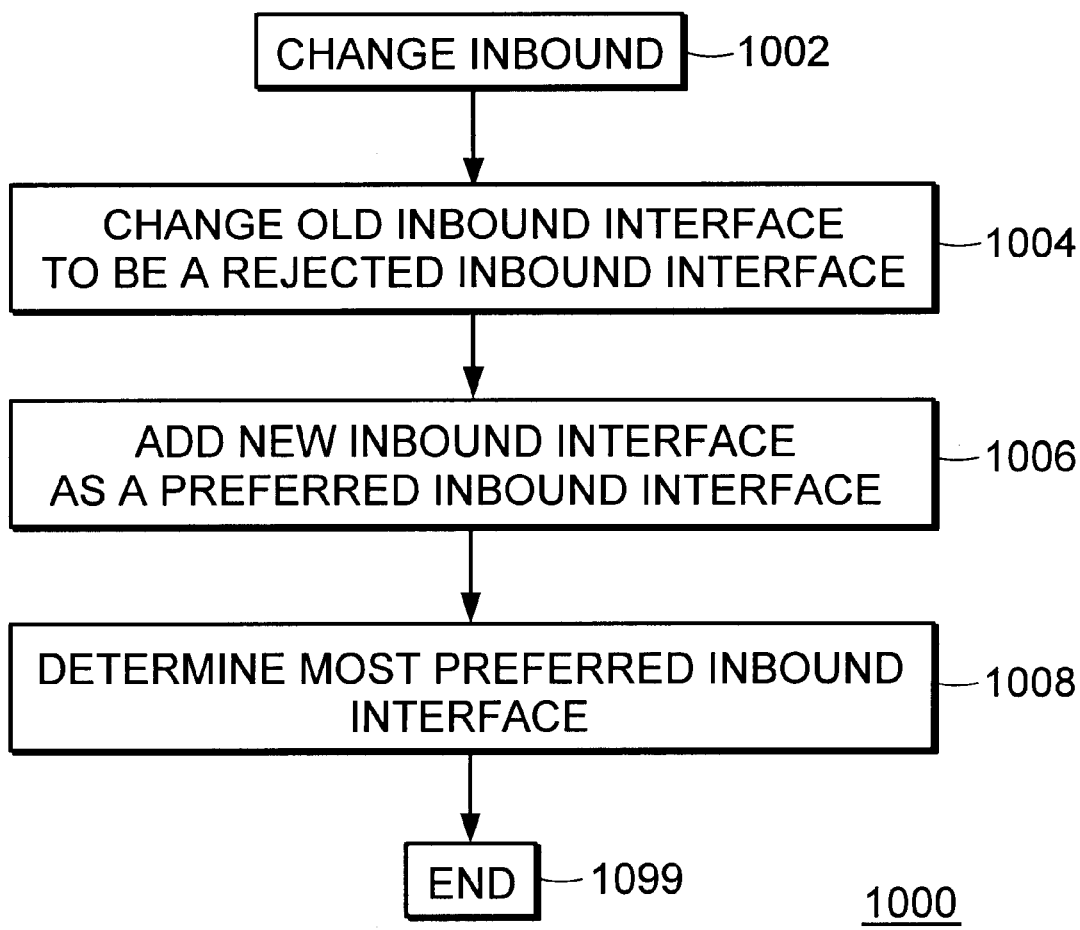
FIG. 10 is a logic flow diagram showing exemplary logic for changing the inbound interface for a forwarding state in accordance with an embodiment of the invention.

FIG. 10 shows exemplary logic 1000 for changing the (S/prefix,G) inbound interface. Beginning at step 1002, the logic changes the old inbound interface to be a rejected inbound interface, in step 1004, adds a new inbound interface as a preferred inbound interface, in step 1006, and determines the most preferred inbound interface from among the preferred inbound interfaces using a predetermined priority scheme, in step 1008. The logic 1000 terminates in step 1099.

With reference again to FIG. 9, after changing the (S/prefix,G) inbound interface (1000), the logic determines whether the new inbound interface was previously an outbound interface for (S/prefix,G), in step 904. If the new inbound interface was previously an outbound interface for (S/prefix,G) (YES in step 906), then the logic removes the new inbound interface from the (S/prefix,G) outbound list, in step 908. Whether or not the new inbound interface was previously an outbound interface for (S/prefix,G), the logic proceeds to determine whether the old inbound interface is now an outbound interface for (S/prefix,G) using the logic 1100 shown and described with reference to FIG. 11.

Figure 11:
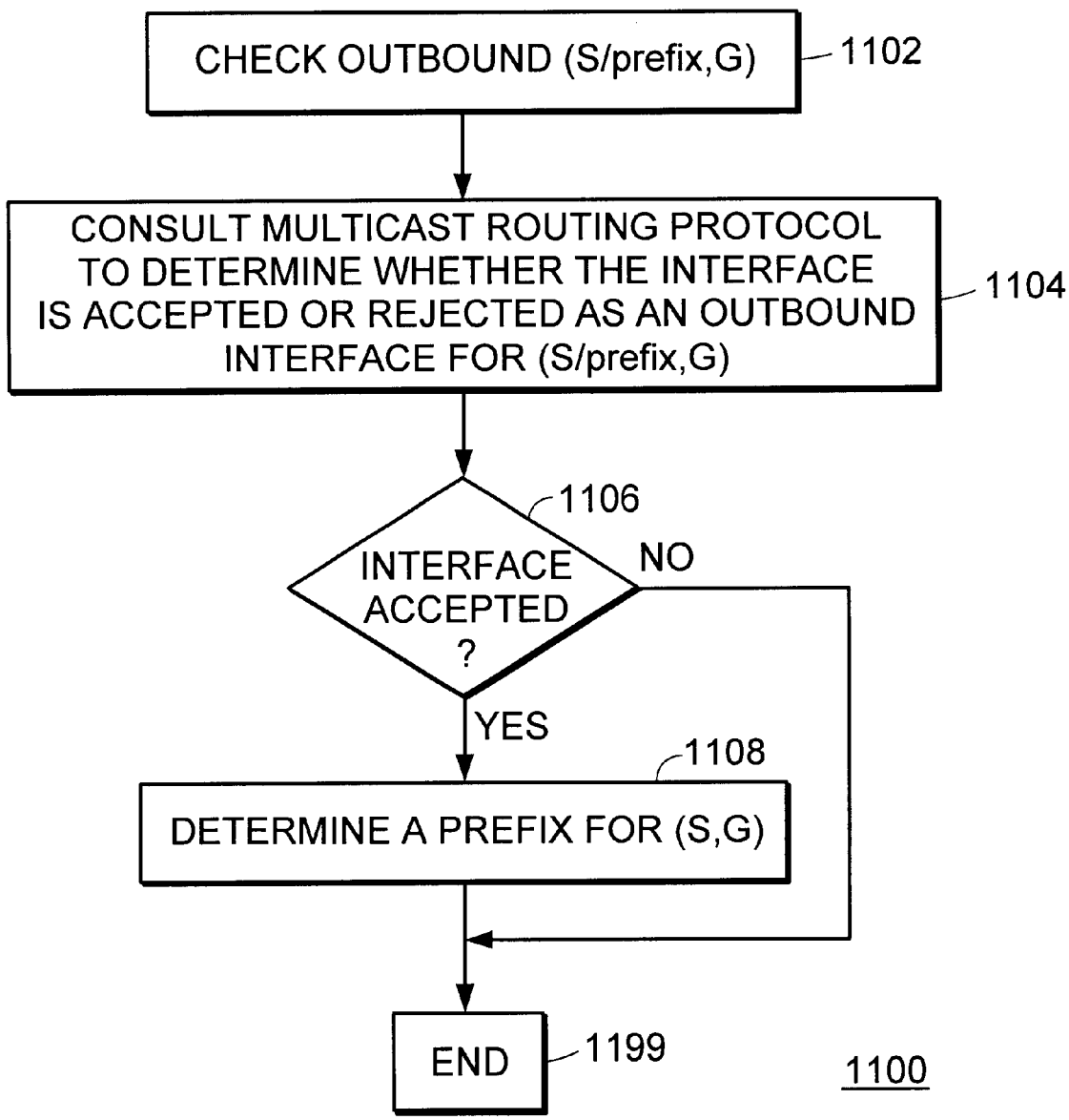
FIG. 11 is a logic flow diagram showing exemplary logic for determining whether an interface is an outbound interface for a forwarding state in accordance with an embodiment of the invention.

FIG. 11 shows exemplary logic 1100 for determining whether the old inbound interface is now an outbound interface for (S/prefix,G). Beginning at step 1102, the logic consults a multicast routing protocol on the interface to determine whether the interface is accepted or rejected as an outbound interface for (S/prefix,G), in step 1104, and, if the interface is accepted as an outbound interface for (S/prefix,G) (YES in step 1106), determines a prefix for (S,G) that is specific to the outbound interface, in step 1108. The logic 1100 terminates in step 1199.

With reference again to FIG. 9, after determining whether the old inbound interface is now an outbound interface for (S/prefix,G) (1100), if the old inbound interface is now an outbound interface for (S/prefix,G) (YES in step 912), then the logic adds the old inbound interface to the (S/prefix,G) outbound list, in step 914. The logic 900 terminates in step 999.

With reference again to FIG. 5, after updating the forwarding table (600), the logic searches the forwarding table for a (S/prefix,G) forwarding entry that is less specific compared to the NewRoute, in step 504. If such a (S/prefix,G) forwarding entry is found (YES in step 506), the logic determines whether S is in the NewRoute, in step 508. If S is not in the NewRoute (NO in step 510), then the router determines a new prefix (NewPrefix) for S such that S/NewPrefix does not overlap with NewRoute using the logic 700 as shown and described with reference to FIG. 7, and re-prefixes the forwarding entry to (S/NewPrefix,G) using the logic 800 as shown and described with reference to FIG. 8. If S is in the NewRoute (YES in step 510), then the logic re-prefixes the forwarding entry with a new prefix (NewPrefix) set to the prefix associated with the NewRoute using the logic 800 as shown and described with reference to FIG. 8, determines the next hop interface toward NewRoute (512), and updates the (S/NewPrefix,G) inbound and outbound interfaces using the logic 900 shown and described with reference to FIG. 9. The logic 500 terminates in step 599.

Figure 7:
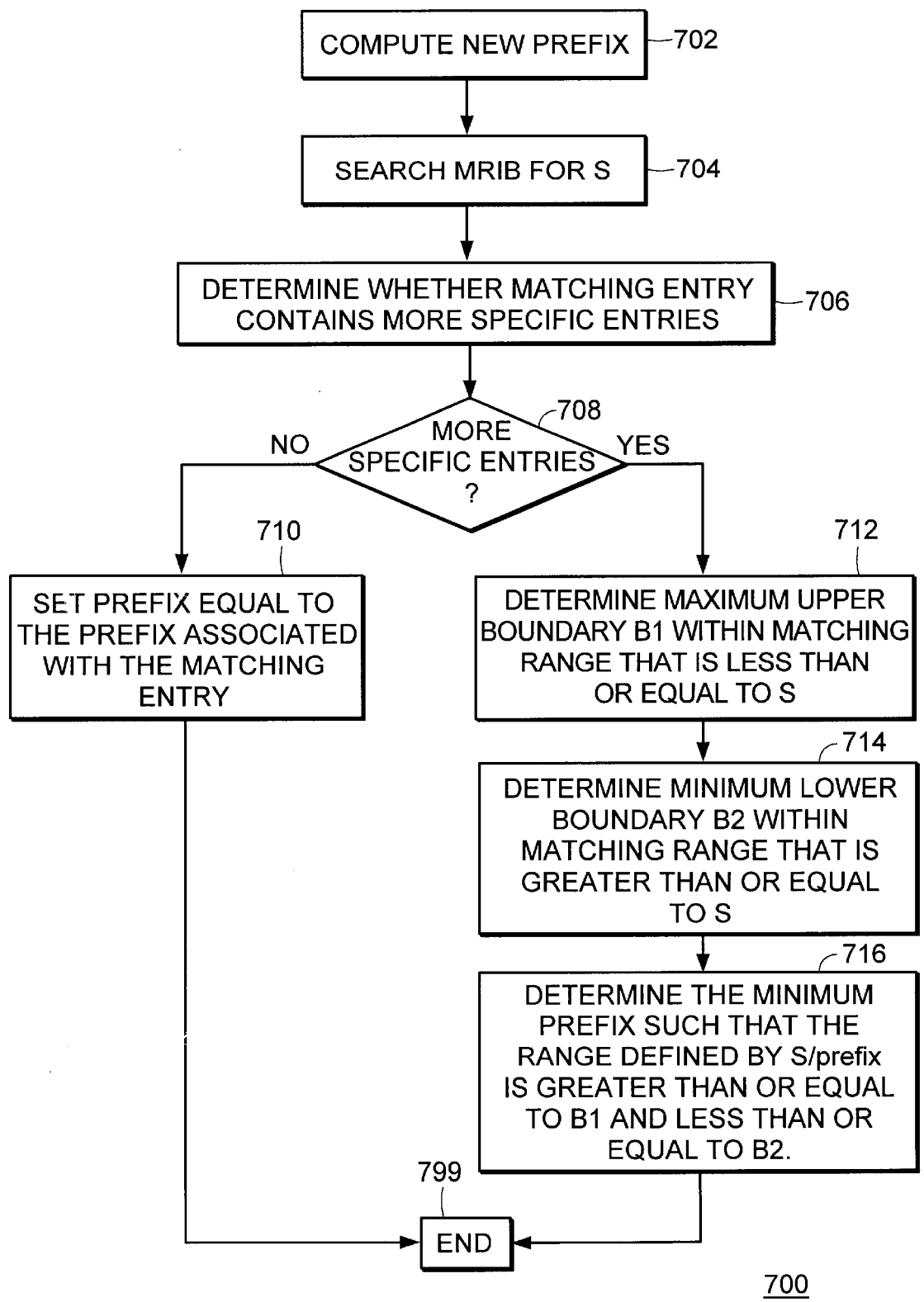
FIG. 7 is a logic flow diagram showing exemplary logic for computing a prefix for the source address S in accordance with an embodiment of the invention.

FIG. 7 shows exemplary logic 700 for computing a new prefix for S. Beginning at step 702, the logic searches the MRIB for S, in step 704, and determines whether the matching entry contains more-specific entries, in step 706. If the matching entry does not contain more-specific entries (NO in step 708), then the logic sets the new prefix equal to the prefix associated with the matching entry, in step 710. If the matching entry does contain more-specific entries (YES in step 708), then the logic determines the maximum upper boundary B1 within the matching range that is less than or equal to S, in step 712. The logic also determines the minimum lower boundary B2 within the matching range that is greater than or equal to S, in step 714. The logic then determines the new prefix equal to the minimum prefix such that the source address range defined by S/prefix is greater than or equal to B1 and less than or equal to B2, in step 716. The logic 700 terminates in step 799.

Figure 8:
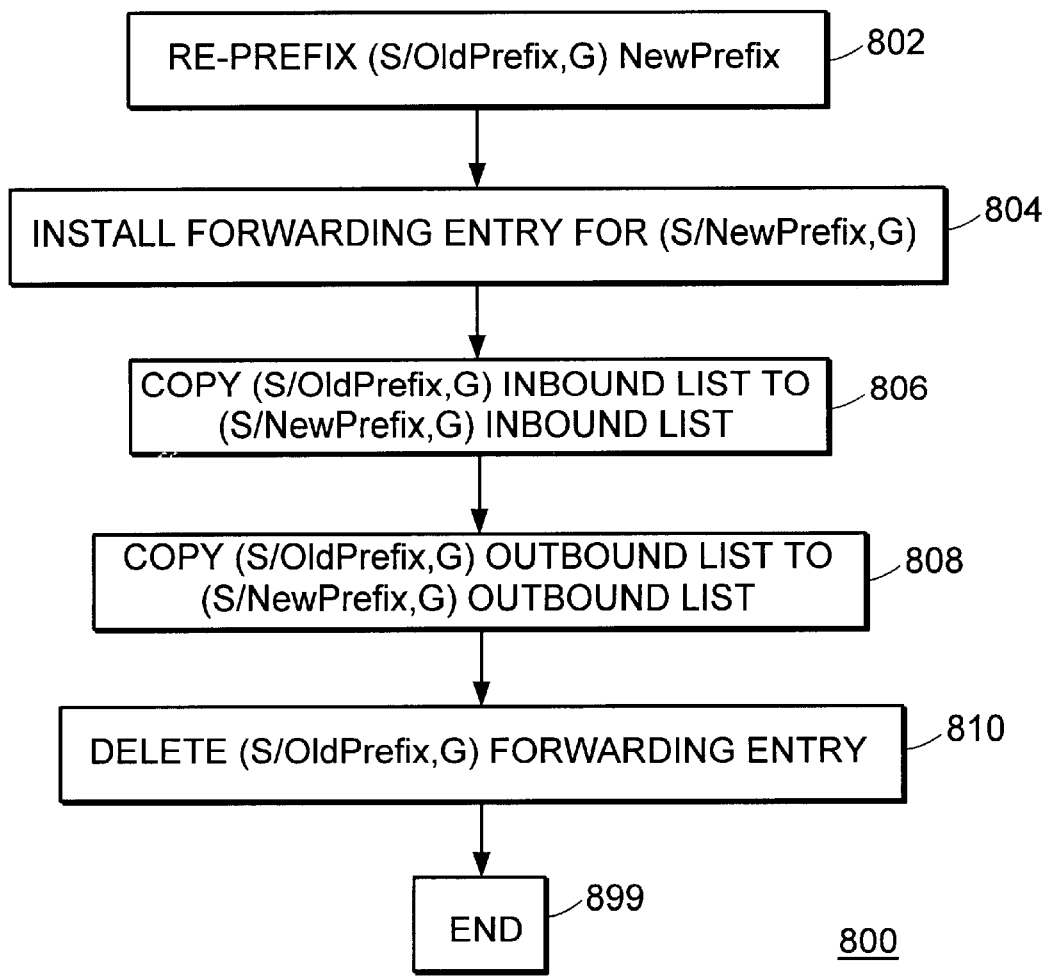
FIG. 8 is a logic flow diagram showing exemplary logic for re-prefixing a forwarding state from an old prefix to a new prefix in accordance with an embodiment of the invention.

FIG. 8 shows exemplary logic 800 for re-prefixing a forwarding entry from an old prefix to a new prefix. Beginning at step 802, the logic installs a forwarding entry for (S/NewPrefix,G), in step 804. The logic then copies the (S/OldPrefix,G) inbound list to the (S/NewPrefix,G) inbound list, in step 806, and copies the (S/OldPrefix,G) outbound list to the (S/NewPrefix,G) outbound list, in step 808. The logic then deletes the (S/OldPrefix,G) forwarding entry, in step 810. The logic 800 terminates in step 899.

When the router determines that an existing route (ExistingRoute) has changed, the router locates all forwarding entries (S/prefix,G) such that the source address range defined by S/prefix is contained in the ExistingRoute. For each such forwarding entry, the router searches the MRIB for S and determines whether S is contained in a more specific range other than ExistingRoute. If S is contained in a more specific route other than ExistingRoute, then the router makes no change to the forwarding entry. If S is not contained in a more specific route other than ExistingRoute, then the router determines whether the ExistingRoute causes the inbound interface to change from an old inbound interface to a new inbound interface. If the ExistingRoute does not cause the inbound interface to change from an old inbound interface to a new inbound interface, then the router makes no change to the forwarding entry. If the ExistingRoute causes the inbound interface to change from an old inbound interface to a new inbound interface, then the router updates the (S/prefix,G) inbound and outbound interfaces.

Specifically, in order to update the (S/prefix,G) inbound and outbound interfaces, the router sets the old inbound interface to rejected, sets the new inbound interface to preferred, and determines the most preferred inbound interface from among the preferred inbound interfaces using a predetermined priority scheme. It should be noted that the new inbound interface may or may not be the most preferred inbound interface. The router also determines whether the new inbound interface was previously an outbound interface for (S/prefix,G), and deletes the new inbound interface from the (S/prefix,G) outbound list if the new inbound interface was previously an outbound interface for (S/prefix,G). Furthermore, the router determines whether the old inbound interface is now an outbound interface for (S/prefix,G), and adds the old inbound interface to the (S/prefix,G) outbound list if the old inbound interface is now an outbound interface for (S/prefix,G).

Figure 12:
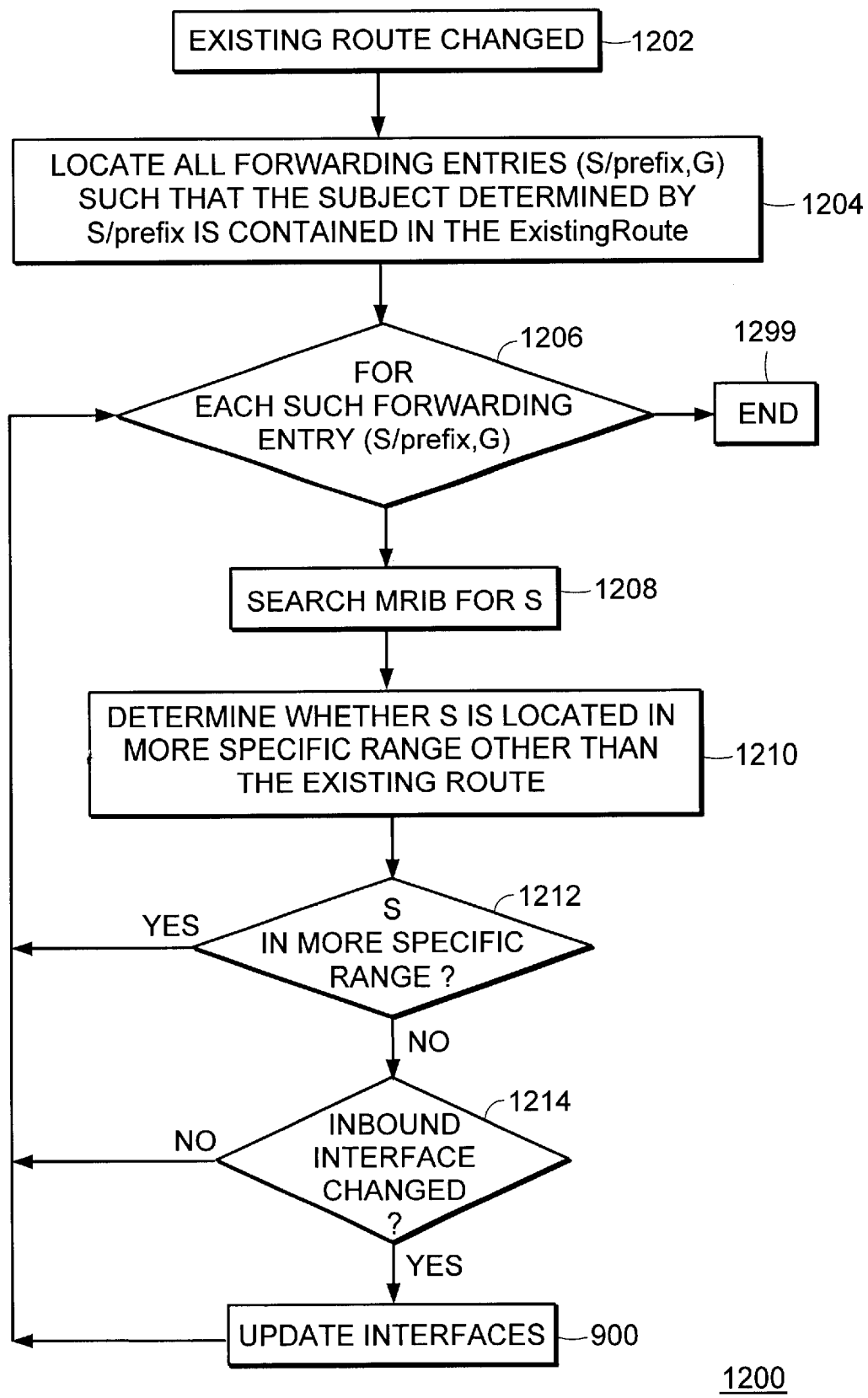
FIG. 12 is a logic flow diagram showing exemplary logic for processing an changed multicast route in accordance with an embodiment of the invention.

FIG. 12 shows exemplary logic 1200 for processing an existing route change. Beginning at step 1202, and upon determining that an existing route (ExistingRoute) has changed, the logic locates all forwarding entries (S/prefix,G) such that the source address range defined by S/prefix is contained in the ExistingRoute, in step 1204. For each such forwarding entry, the logic searches the MRIB for S, in step 1208, and determines whether is contained in a more specific range other than ExistingRoute, in step 1210. If S is contained in a more specific route other than ExistingRoute (YES in step 1212), then the logic makes no change to the forwarding entry, in which case the logic recycles to step 1206 to process another forwarding entry. If S is not contained in a more specific route other than ExistingRoute (NO in step 1212), then the logic determines whether the ExistingRoute causes the inbound interface to change from an old inbound interface to a new inbound interface, in step 1214. If the ExistingRoute does not cause the inbound interface to change from an old inbound interface to a new inbound interface (NO in step 1214), then the logic makes no change to the forwarding entry, in which case the logic recycles to step 1206 to process another forwarding entry. If the ExistingRoute causes the inbound interface to change from an old inbound interface to a new inbound interface (YES in step 1214), then the logic updates the (S/prefix,G) inbound and outbound interfaces using the logic 900 shown and described with reference to FIG. 9. After processing each such forwarding entry, the logic 1200 terminates in step 1299.

When the router ages an existing route (AgedRoute), the router searches the MRIB for the less specific route (LessSpecificRoute) of the AgedRoute. It should be noted that the LessSpecificRoute may or may not exist. For example, with reference to FIG. 1, there is no less specific route for y1 (116).

After searching the MRIB for the LessSpecificRoute, the router locates all forwarding entries (S/prefix,G) such that the source address range defined by S/prefix is contained in the AgedRoute. For each such forwarding entry, the router searches the MRIB for S and determines whether S is contained in a more specific range other than AgedRoute. If S is contained in a more specific route other than AgedRoute, then the router makes no change to the forwarding entry. If S is not contained in a more specific route other than AgedRoute, then the router determines whether the LessSpecificRoute exists. If the LessSpecificRoute does not exist, then the router sets the inbound interface to rejected. If the LessSpecificRoute exists, then the router determines whether the LessSpecificRoute causes the inbound interface to change from an old inbound interface to a new inbound interface. If the LessSpecificRoute does not cause the inbound interface to change from an old inbound interface to a new inbound interface, then the router makes no change to the forwarding entry. If the LessSpecificRoute causes the inbound interface to change from an old inbound interface to a new inbound interface, then the router updates the (S/prefix,G) inbound and outbound interfaces.

Specifically, in order to update the (S/prefix,G) inbound and outbound interfaces, the router sets the old inbound interface to rejected, sets the new inbound interface to preferred, and determines the most preferred inbound interface from among the preferred inbound interfaces using a predetermined priority scheme. It should be noted that the new inbound interface may or may not be the most preferred inbound interface. The router also determines whether the new inbound interface was previously an outbound interface for (S/prefix,G), and deletes the new inbound interface from the (S/prefix,G) outbound list if the new inbound interface was previously an outbound interface for (S/prefix,G). Furthermore, the router determines whether the old inbound interface is now an outbound interface for (S/prefix,G), and adds the old inbound interface to the (S/prefix,G) outbound list if the old inbound interface is now an outbound interface for (S/prefix,G).

Figure 13:
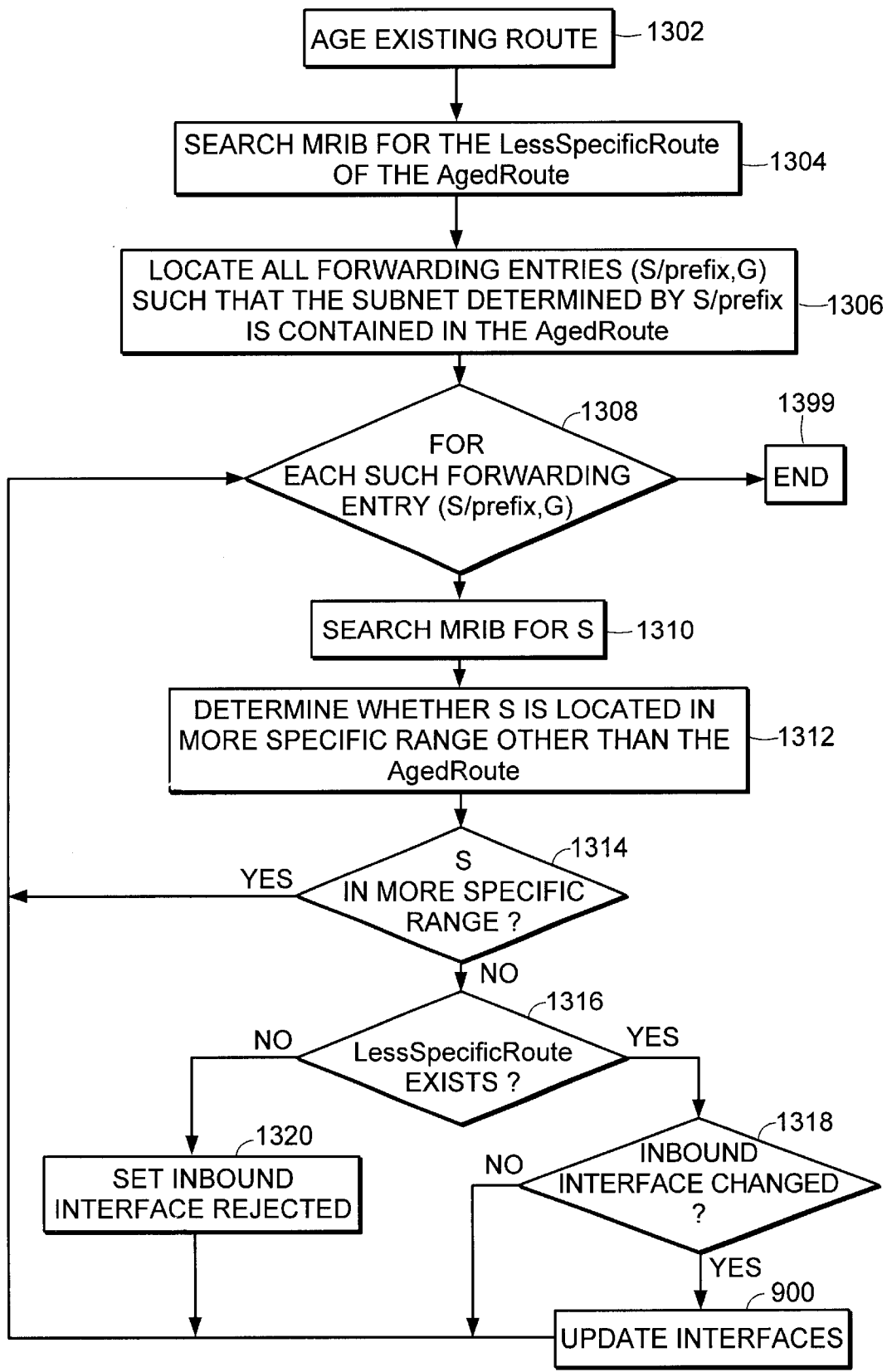
FIG. 13 is a logic flow diagram showing exemplary logic for processing an aged multicast route in accordance with an embodiment of the invention.

FIG. 13 shows exemplary logic 1300 for processing an aged route. Beginning at step 1302, and upon learning an existing route to be aged or being aged (AgedRoute), the logic searches the MRIB for a less specific route (LessSpecificRoute) of the AgedRoute, in step 1304. The logic then locates all forwarding entries (S/prefix,G) such that the source address range defined by S/prefix is contained in the AgedRoute, in step 1306. For each such forwarding entry, the logic searches the MRIB for S, in step 1310, and determines whether S is contained in a more specific range other than AgedRoute, in step 1312. If S is contained in a more specific route other than AgedRoute (YES in step 1314), then the logic makes no change to the forwarding entry, in which case the logic recycles to step 1308 to process another forwarding entry. If S is not contained in a more specific route other than AgedRoute (NO in step 1314), then the logic determines whether the LessSpecificRoute exists, in step 1316. If the LessSpecificRoute does not exist (NO in step 1316), then the logic sets the inbound interface to rejected, in step 1320, and recycles to step 1308 to process another forwarding entry. If the LessSpecificRoute exists (YES in step 1316), then the logic determines whether the LessSpecificRoute causes the inbound interface to change from an old inbound interface to a new inbound interface, in step 1318. If the LessSpecificRoute does not cause the inbound interface to change from an old inbound interface to a new inbound interface (NO in step 1318), then the logic makes no change to the forwarding entry, in which case the logic recycles to step 1308 to process another forwarding entry. If the LessSpecificRoute causes the inbound interface to change from an old inbound interface to a new inbound interface (YES in step 1318), then the logic updates the (S/prefix,G) inbound and outbound interfaces using the logic 900 shown and described with reference to FIG. 9. After processing each such forwarding entry, the logic 1300 terminates in step 1399.

When the router receives a packet for a particular (S,G) pair, the router searches the forwarding table for a matching (S/prefix,G) forwarding entry. If a matching forwarding entry is not found, the router installs a (S/prefix,G) forwarding entry for (S,G). In a preferred embodiment of the invention, the router initially installs a transitional most-specific forwarding entry (S/32,G) for (S,G). The router then determines whether the interface is accepted or rejected as an inbound interface for (S/prefix,G). If the interface is accepted as an inbound interface for (S/prefix,G), then the router determines an initial prefix (InitialPrefix) for (S,G) that is as short as possible, determines a preference level for the interface, adds the interface to the (S/prefix,G) inbound list as a preferred inbound interface, and determines the most-preferred inbound interface from among all preferred inbound interfaces. The router also determines all outbound interfaces for (S/prefix,G), and forwards the packet to the outbound interface(s). Furthermore, the router determines whether all interfaces (i.e., the most-preferred inbound interface and all outbound interfaces) agree to use a particular prefix (LongerPrefix) that is greater than or equal to the InitialPrefix, and re-prefixes the (S/32,G) forwarding entry to use the LongerPrefix if all interfaces agree to use the LongerPrefix. On the other hand, if the interface is rejected as an inbound interface for (S/prefix,G), then the router adds the interface to the (S/prefix,G) inbound list as a rejected inbound interface, and drops the packet.

It should be noted that the transitional most-specific forwarding entry (S/32,G) allows the packet to be accepted and forwarded if the inbound interface is accepted as an inbound interface. However, if all interfaces agree to use the shorter (i.e., less specific) prefix LongerPrefix, then the router re-prefixes the (S/32,G) forwarding entry to use the LongerPrefix. Thereafter, the router uses the (S/LongerPrefix,G) forwarding entry to process packets.

Figure 14:
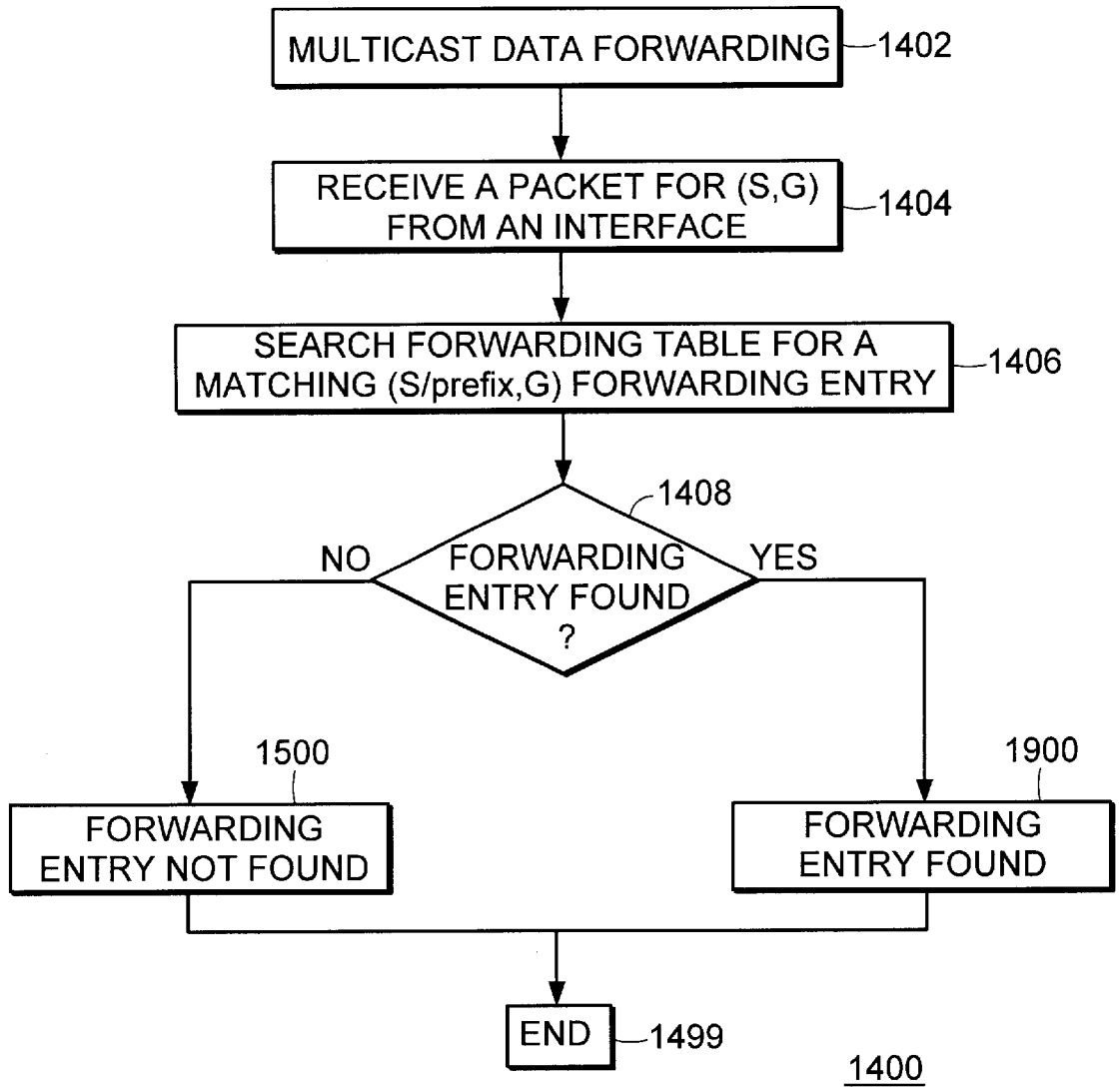
FIG. 14 is a logic flow diagram showing exemplary logic for processing a multicast packet in accordance with an embodiment of the invention.

FIG. 14 shows exemplary logic 1400 for processing a multicast packet for (S,G). Beginning at step 1402, and upon receiving a packet for (S,G) from an interface, in step 1404, the logic searches the forwarding table for a matching (S/prefix,G) forwarding entry, in step 1406. If a matching (S/prefix,G) forwarding entry is not found (NO in step 1408), then the logic proceeds according to the logic 1500 shown and described with reference to FIG. 15. If a matching (S/prefix,G) forwarding entry is found (YES in step 1408), then the logic proceeds according to the logic 1900 shown and described with reference to FIG. 19. The logic 1400 terminates in step 1499.

Figure 15:
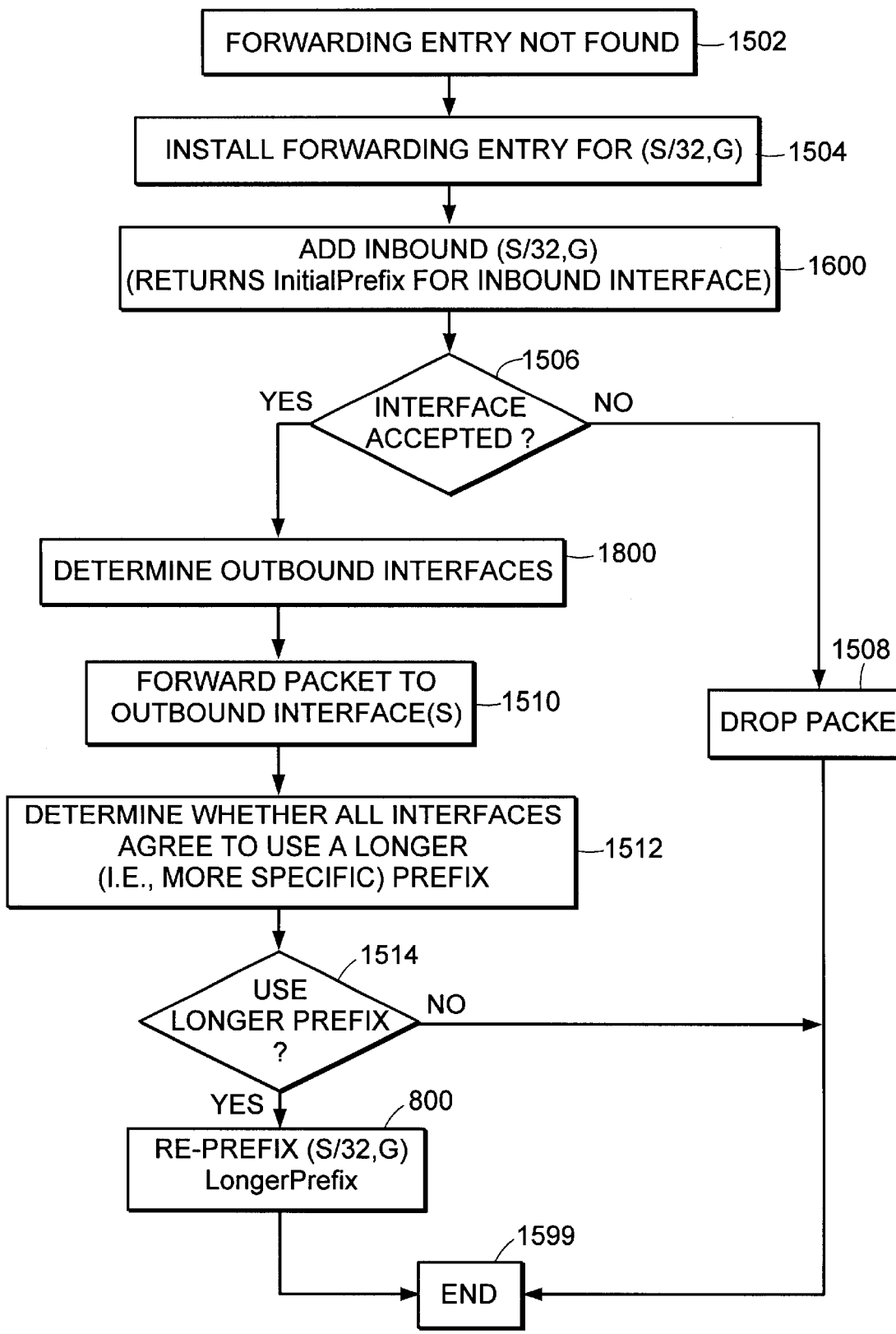
FIG. 15 is a logic flow diagram showing exemplary logic for processing the multicast packet when there is no forwarding state for the multicast packet in accordance with an embodiment of the invention.

FIG. 15 shows exemplary logic 1500 for proceeding when a matching (S/prefix,G) forwarding entry is not found. Beginning at step 1502, the logic installs a forwarding entry for (S/32,G), in step 1504, and adds the interface to the (S/32,G) inbound list as either a preferred inbound interface or a rejected inbound interface according to the logic 1600 shown and described with reference to FIG. 16 below. As part of adding the interface to the (S/32,G) inbound list, the router may determine an initial prefix (InitialPrefix) for (S,G) as well as a preference level for the interface. If the interface is rejected as an inbound interface for (S/32,G), then the logic drops the packet, in step 1508. If the interface is accepted as an inbound interface for (S/32,G), then the logic determines the outbound interfaces for (S/32,G) according to the logic 1800 shown and described with reference to FIG. 18 below, and then forwards the packet to the outbound interface(s), in step 1510. The logic also determines whether all interfaces (i.e., the most-preferred inbound interface and all outbound interfaces) agree to use a particular prefix (LongerPrefix). If all interfaces agree to use the LongerPrefix (YES in step 1514), then the logic re-prefixes the (S/32,G) forwarding entry to use the LongerPrefix according to the logic 800 shown and described with reference to FIG. 8 above. The logic 1500 terminates in step 1599.

Figure 16:
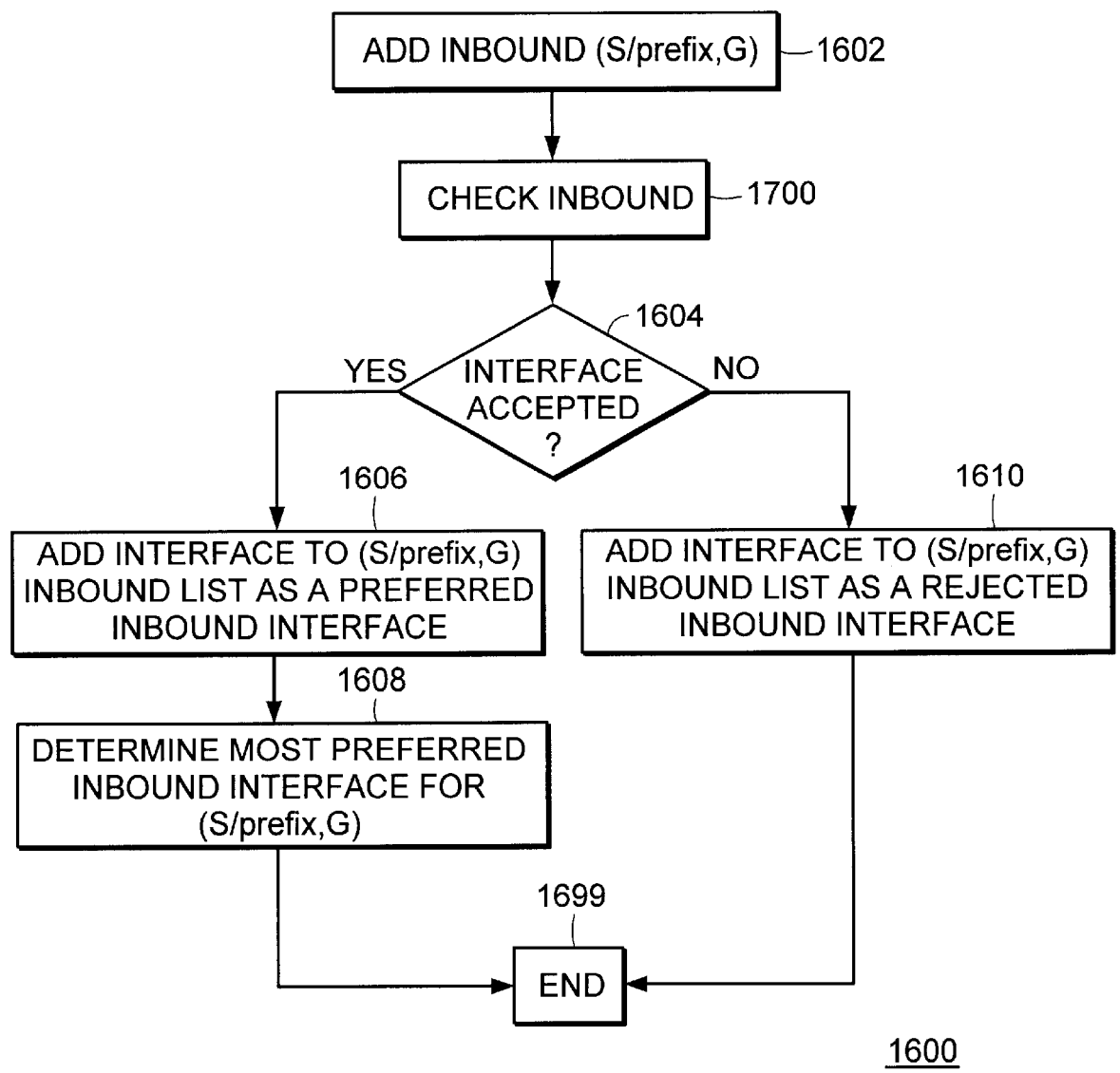
FIG. 16 is a logic flow diagram showing exemplary logic for adding an inbound interface to a forwarding state in accordance with an embodiment of the invention.

FIG. 16 shows exemplary logic 1600 for adding an interface to a (S/prefix,G) forwarding entry. Beginning at step 1602, the logic determines whether the interface is accepted or rejected as an inbound interface for (S/prefix,G) using the logic 1700 shown and described with reference to FIG. 17. If the interface is accepted as an inbound interface for (S/prefix,G) (YES in step 1604), then the logic adds the interface to the (S/prefix,G) inbound list as a preferred inbound interface, in step 1606, and determines the most-preferred inbound interface from among all preferred inbound interfaces, in step 1608. If the interface is rejected as an inbound interface for (S/prefix,G) (NO in step 1604), then the logic adds the interface to the (S/prefix,G) inbound list as a rejected inbound interface, in step 1610. The logic 1600 terminates in step 1699.

Figure 17:
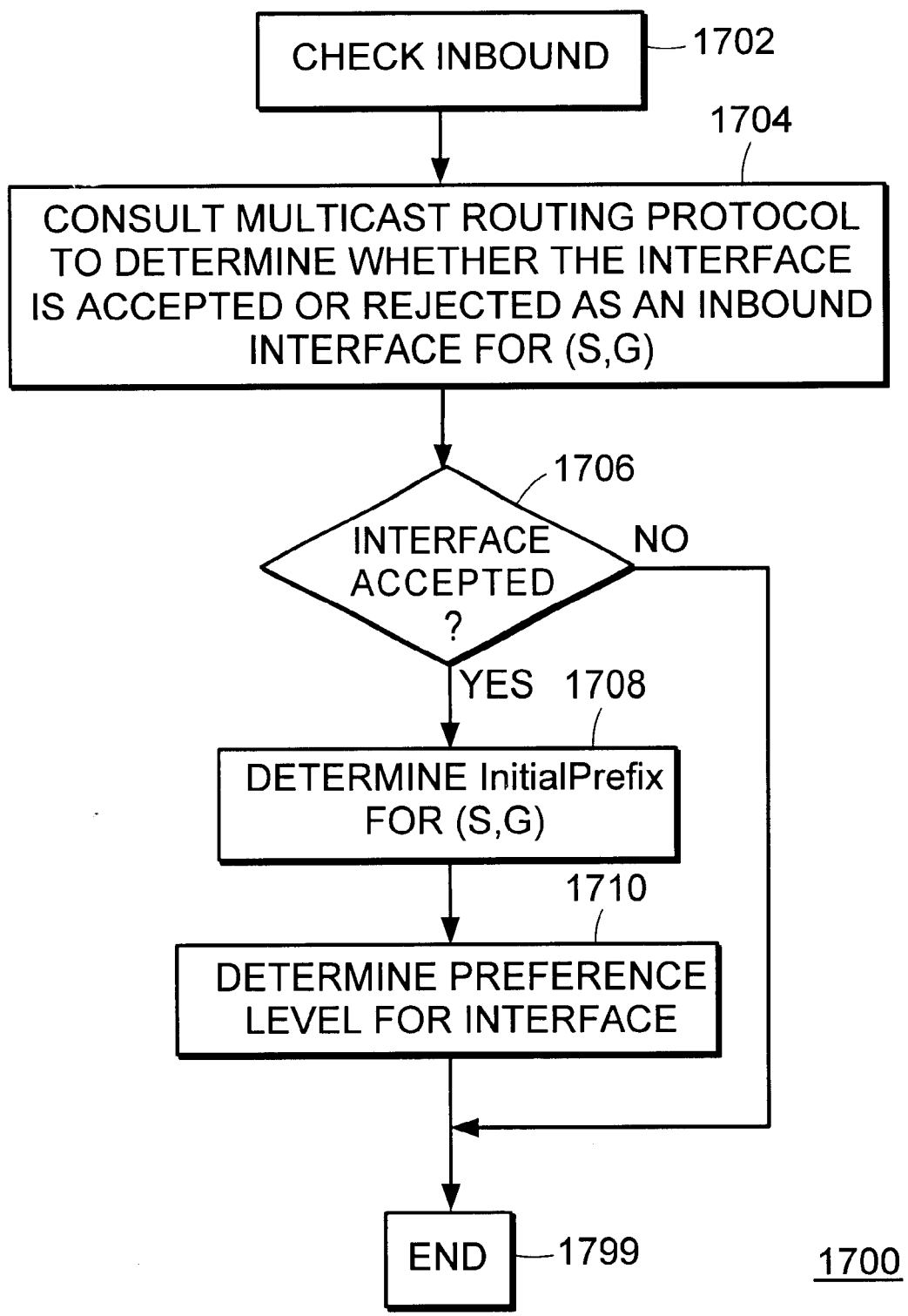
FIG. 17 is a logic flow diagram showing exemplary logic for determining whether an interface is a preferred inbound interface for a forwarding state in accordance with an embodiment of the invention.

FIG. 17 shows exemplary logic 1700 for determining whether an interface is accepted or rejected as an inbound interface for (S/prefix,G). Beginning at step 1702, the logic consults a multicast routing protocol on the interface to determine whether the interface is accepted or rejected as an inbound interface for (S/prefix,G), in step 1704. If the interface is accepted as an inbound interface for (S/prefix,G) (YES in step 1706), then the logic determines an initial prefix (InitialPrefix) for (S,G) that is as short as possible, in step 1708, and determines a preference level for the interface using a predetermined priority scheme, in step 1710. The logic 1700 terminates in step 1799.

Figure 18:
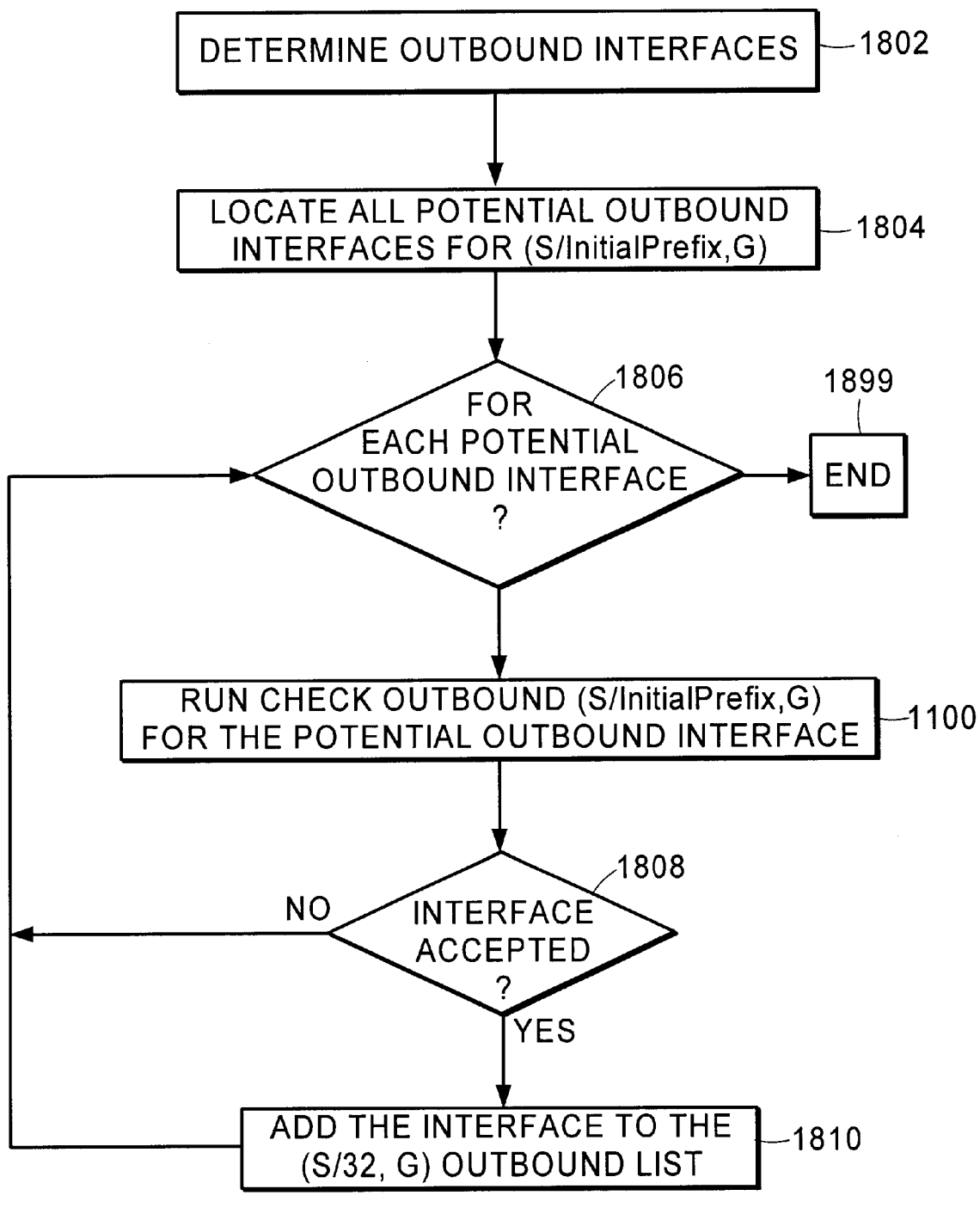
FIG. 18 is a logic flow diagram showing exemplary logic for determining the outbound interfaces for a newly installed forwarding state in accordance with an embodiment of the invention.

FIG. 18 shows exemplary logic 1800 for determining the outbound interfaces for (S/32,G). Beginning at step 1802, the logic locates all potential outbound interfaces for (S/InitialPrefix,G), in step 1804. For each potential outbound interface, the logic determines whether the interface is accepted or rejected as an outbound interface for (S/InitialPrefix,G) according to the logic 1100 shown and described with reference to FIG. 11 above. If the interface is rejected as an outbound interface (NO in step 1808), then the logic recycles to step 1806 to process another potential outbound interface. If the interface is accepted as an outbound interface (YES in step 1808), then the logic adds the interface to the (S/32,G) outbound list, in step 1810, and recycles to step 1806 to process another potential outbound interface. The logic 1800 terminates in step 1899 after processing all potential outbound interfaces.

Figure 19:
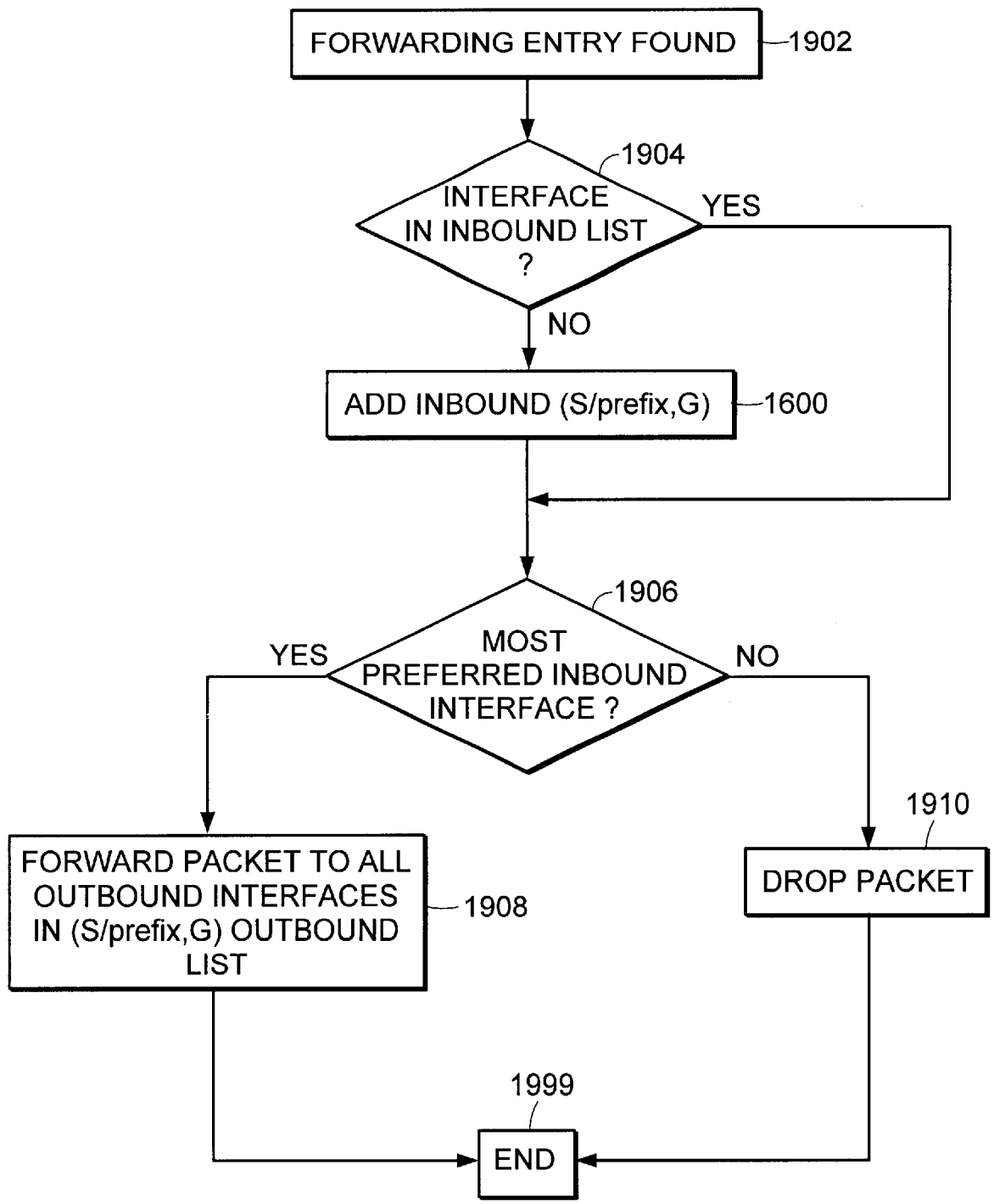
FIG. 19 is a logic flow diagram showing exemplary logic for processing the multicast packet when there is a forwarding state for the multicast packet in accordance with an embodiment of the invention.

FIG. 19 shows exemplary logic 1900 for proceeding when a matching (S/prefix,G) forwarding entry is found. Beginning at step 1902, the logic first determines whether the interface is in the (S/prefix,G) inbound list, in step 1904. If the interface is not in the (S/prefix,G) inbound list (NO in step 1904), then the logic adds the interface to the (S/prefix,G) inbound list as either a preferred inbound interface or a rejected inbound interface according to the logic 1600 shown and described with reference to FIG. 16 above. As part of adding the interface to the (S/prefix,G) inbound list, the router may determine an initial prefix (InitialPrefix) for (S,G) as well as a preference level for the interface. Whether or not the logic adds the interface to the (S/prefix,G) inbound list, the logic determines whether the interface is the most-preferred inbound interface, in step 1906. If the interface is the most-preferred inbound interface (YES in step 1906), then the logic forwards the packet to all outbound interfaces in the (S/prefix,G) outbound list, in step 1908. If the interface is not the most-preferred inbound interface (NO in step 1906), then the logic drops the packet, in step 1910. The logic 1900 terminates in step 1999.

The described logic utilizes the CHECK INBOUND (1700) and CHECK OUTBOUND (1100) logic to determine whether a particular interface is acceptable as an inbound interface or an outbound interface, respectively. Because the CHECK INBOUND (1700) and CHECK OUTBOUND (1100) operations consult a multicast routing protocol in order to determine whether a particular interface is acceptable, the CHECK INBOUND (1700) and CHECK OUTBOUND (1100) operations are relatively time-consuming. In certain situations, it is possible to reduce the number of times the CHECK INBOUND (1700) and CHECK OUTBOUND (1100) operations are used, specifically by taking advantage of the way certain multicast routing protocols work.

In particular, certain multicast routing protocols, such as PIM Sparse Mode, Call-Based Tree (CBT) and Border Gateway Multicast Protocol (BGMP), require a multicast group member to explicitly join the multicast distribution tree in order to receive multicast packet and leave the multicast distribution tree in order to stop receiving multicast packets. For convenience, such a multicast routing protocol will be referred to hereinafter as a sparse mode (SM) protocol. A router that implements a SM protocol is referred to hereinafter as a SM router, and a router interface that is configured to run the SM protocol is referred to hereinafter as a SM interface.

Although different SM protocols use different terms for joining and leaving a multicast distribution tree, the terms "join" and "prune" will be used hereinafter irrespective of any particular SM protocol. A multicast group member can join the multicast distribution tree for a specific multicast source S by sending a join request for a specific (S,G) pair. In some SM protocols (such as PIM-SM), the multicast group member can also join the multicast distribution tree for all multicast sources by sending a join request for (*,G), where the "*" indicates any multicast source associated with the multicast group G. Likewise, a multicast group member can leave the multicast distribution tree for a specific multicast source S by sending a prune request for a specific (S,G) pair, or the multicast group member can leave the multicast distribution tree for all multicast sources by sending a prune request for (*,G).

Each SM router that receives a join request establishes the appropriate multicast forwarding entries to accept and forward multicast packets. A forwarding entry corresponding to (*,G) is referred to as a "default" forwarding entry, while a forwarding entry corresponding to a specific (S,G) pair is referred to as a "non-default" forwarding entry. In a preferred embodiment, a default forwarding entry utilizes a source address of 0.0.0.0 and a prefix of zero (0) so that any source address matches the default forwarding entry. For convenience, such a default forwarding entry for (*,G) is designated as (0.0.0.0/0,G).

Because a SM protocol requires all multicast group members to explicitly join the multicast distribution tree, a SM router does not accept multicast packets from the RPF interface unless and until a downstream multicast group member has explicitly joined the multicast distribution tree.

Furthermore, once a downstream multicast group member has explicitly joined the multicast distribution tree, the SM router forwards multicast packets to those SM interfaces from which a join request was received.

Therefore, the SM router identifies SM outbound interfaces without utilizing the CHECK OUTBOUND (1100) operation, specifically by receiving an explicit join message from the SM outbound interfaces. The SM router still utilizes the CHECK OUTBOUND (1100) operation to determine whether the non-SM interfaces are acceptable as outbound interfaces.

Also, if the RPF interface toward the RP router is a SM interface, then the SM router accepts the RPF interface as the inbound interface without utilizing the CHECK INBOUND (1700) operation as long as there is at least one downstream multicast group member. The SM router still utilizes the CHECK INBOUND (1700) operation to determine whether a non-SM interface is acceptable as an inbound interface.

When the router receives a join request for (*,G) from an interface, the router installs a default forwarding entry (0.0.0.0/0,G) if one does not already exist, and adds the interface to the (0.0.0.0/0,G) outbound list without utilizing the CHECK OUTBOUND (1100) operation. Installing the default forwarding entry involves determining the RPF interface towards the RP router and adding the RPF interface to the (0.0.0.0/0,G) inbound list. If the RPF interface is a SM interface, then the RPF interface is added to the (0.0.0.0/0,G) inbound list as a preferred inbound interface without utilizing the CHECK INBOUND (1700) operation. If the RPF interface is a non-SM interface, then the router utilizes the CHECK INBOUND (1700) operation to determine whether the RPF interface is a preferred or rejected inbound interface. Also when installing the default forwarding entry (0.0.0.0/0,G), the router utilizes the CHECK OUTBOUND (1100) operation to determine any non-SM outbound interfaces.

Figure 20:
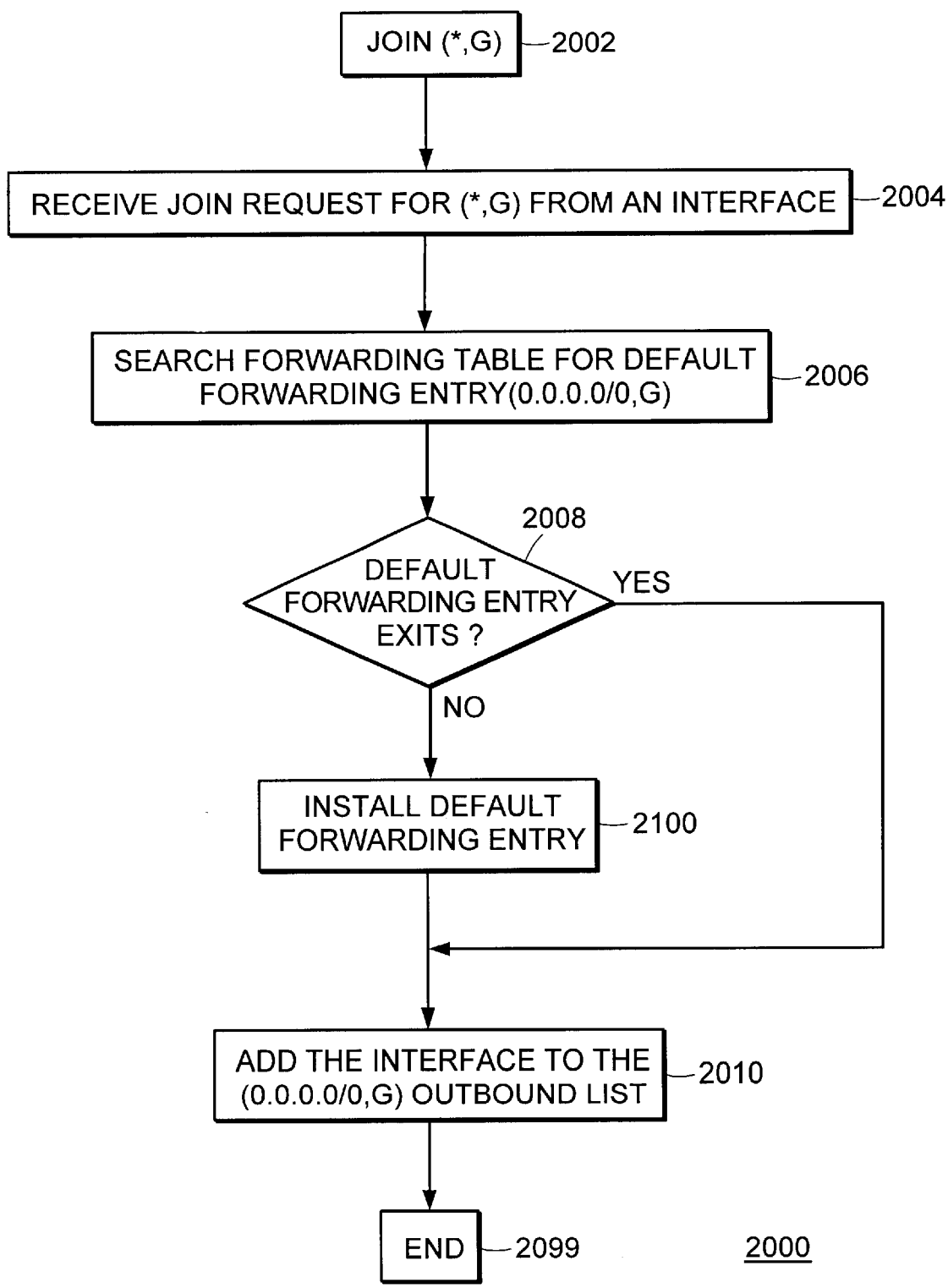
FIG. 20 is a logic flow diagram showing exemplary logic for processing a PIM Join (*,G) request in accordance with an embodiment of the invention.

FIG. 20 shows exemplary logic 2000 for processing a join (*,G) request by the router. Beginning at step 2002, and upon receiving a join request for (*,G) from an interface, in step 2004, the logic searches the forwarding table for a default forwarding entry (0.0.0.0/0,G), in step 2006. If the default forwarding entry (0.0.0.0/0,G) exists (YES in step 2008), then the logic simply adds the interface to the (0.0.0.0/0,G) outbound list, in step 2010. If the default forwarding entry (0.0.0.0/0,G) does not exist (NO in step 2008), then the logic installs the default forwarding entry (0.0.0.0/0,G) using the logic 2100 shown and described with reference to FIG. 21, and adds the interface to the (0.0.0.0/0,G) outbound list, in step 2010. The logic 2000 terminates in step 2099.

Figure 21:
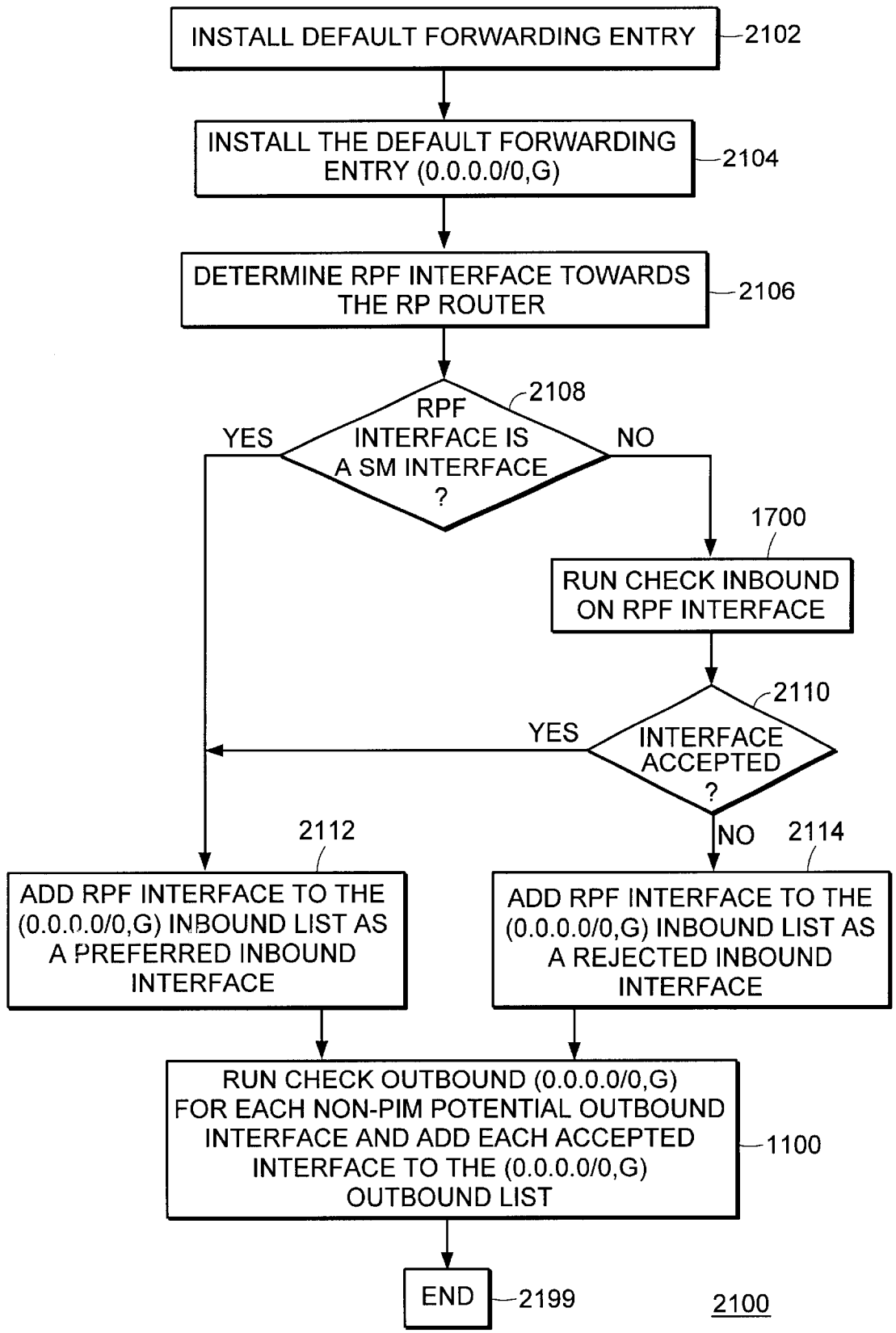
FIG. 21 is a logic flow diagram showing exemplary logic for installing a default forwarding state in accordance with an embodiment of the invention.

FIG. 21 shows exemplary logic 2100 for installing the default forwarding entry. Beginning at step 2102, the logic installs the default forwarding entry (0.0.0.0/0,G), in step 2104, and determines the RPF interface towards the RP router, in step 2106. The logic then determines whether the RPF interface is a SM interface, in step 2108. If the RPF interface is a SM interface (YES in step 2108), then the logic adds the RPF interface to the (0.0.0.0/0,G) inbound list as a preferred inbound interface, in step 2112. If the RPF interface is a non-SM interface (NO in step 2108), then the logic runs CHECK INBOUND (1700) on the RPF interface. If the RPF interface is accepted as an inbound interface (YES in step 2110), then the logic adds the RPF interface to the (0.0.0.0/0,G) inbound list as a preferred inbound interface, in step 2112. If the RPF interface is rejected as an inbound interface (NO in step 2110), then the logic adds the RPF interface to the (0.0.0.0/0,G) inbound list as a rejected inbound interface, in step 2114. In any case, the logic runs CHECK OUTBOUND (1100) for each non-SM potential outbound interface and adds each accepted interface to the (0.0.0.0/0,G) outbound list. The logic 2100 terminates in step 2199.

When the router receives a join (S,G) request from an interface, the router searches for a forwarding entry having a source address range that includes S. For convenience, such a forwarding entry is designated (S2/prefix,G), where S2 is a source address such that S falls within the range defined by S2/prefix. If the router finds the (S2/prefix,G) forwarding entry, then the router simply adds the interface to the (S2/prefix,G) outbound list without utilizing the CHECK OUTBOUND (1100) operation. If the router does not find the (S2/prefix,G) forwarding entry, then the router computes a prefix for S and installs a forwarding entry for (S/prefix,G). The router then copies the (0.0.0.0/0,G) inbound list to the (S/prefix,G) inbound list, copies the (0.0.0.0/0,G) outbound list to the (S/prefix,G) outbound list, and adds the interface to the (S2/prefix,G) outbound list without utilizing the CHECK OUTBOUND (1100) operation.

Figure 22:
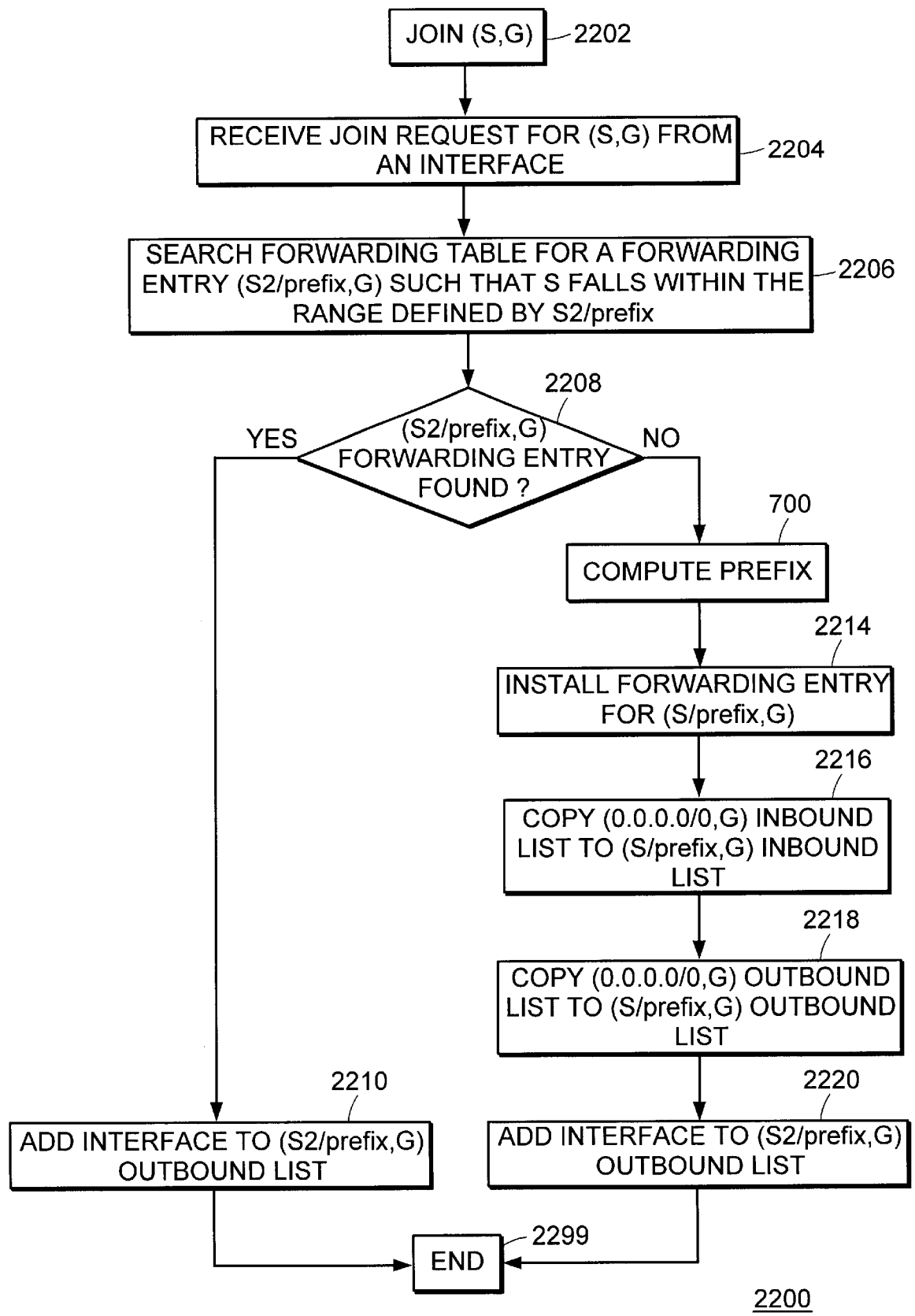
FIG. 22 is a logic flow diagram showing exemplary logic for processing a PIM Join (S,G) request in accordance with an embodiment of the invention.

FIG. 22 shows exemplary logic 2200 for processing a join (S,G) request. Beginning at step 2202, and upon receiving the join (S,G) request from an interface, in step 2204, the logic searches the forwarding table for a forwarding entry (S2/prefix,G) such that S falls within the source address range defined by S2/prefix, in step 2206. If the logic finds the (S2/prefix,G) forwarding entry (YES in step 2208), then the logic adds the interface to the (S2/prefix,G) outbound list, in step 2210. If the logic does not find the (S2/prefix,G) forwarding entry (NO in step 2208), then the logic computes a prefix for S using the logic 700 shown and described with reference to FIG. 7, and installs a forwarding entry for (S/prefix,G), in step 2214. The logic then copies the (0.0.0.0/0,G) inbound list to the (S/prefix,G) inbound list, in step 2216, copies the (0.0.0.0/0,G) outbound list to the (S/prefix,G) outbound list, in step 2218, and adds the interface to the (S2/prefix,G) outbound list without utilizing the CHECK OUTBOUND (1100) operation, in step 2220. The logic 2200 terminates in step 2299.

When the multicast group member wants to leave a particular multicast distribution tree, the multicast group member sends a prune request. A multicast group member can leave the multicast distribution tree for a specific multicast source S by sending a prune request for a specific (S,G) pair, or the multicast group member can leave the multicast distribution tree for all multicast sources by sending a prune request for (*,G).

When the router receives a prune (*,G) request from an interface, the router removes the interface from the (0.0.0.0/0,G) outbound list, and deletes the (0.0.0.0/0,G) forwarding entry if the resulting (0.0.0.0/0,G) outbound list is empty.

Figure 23:
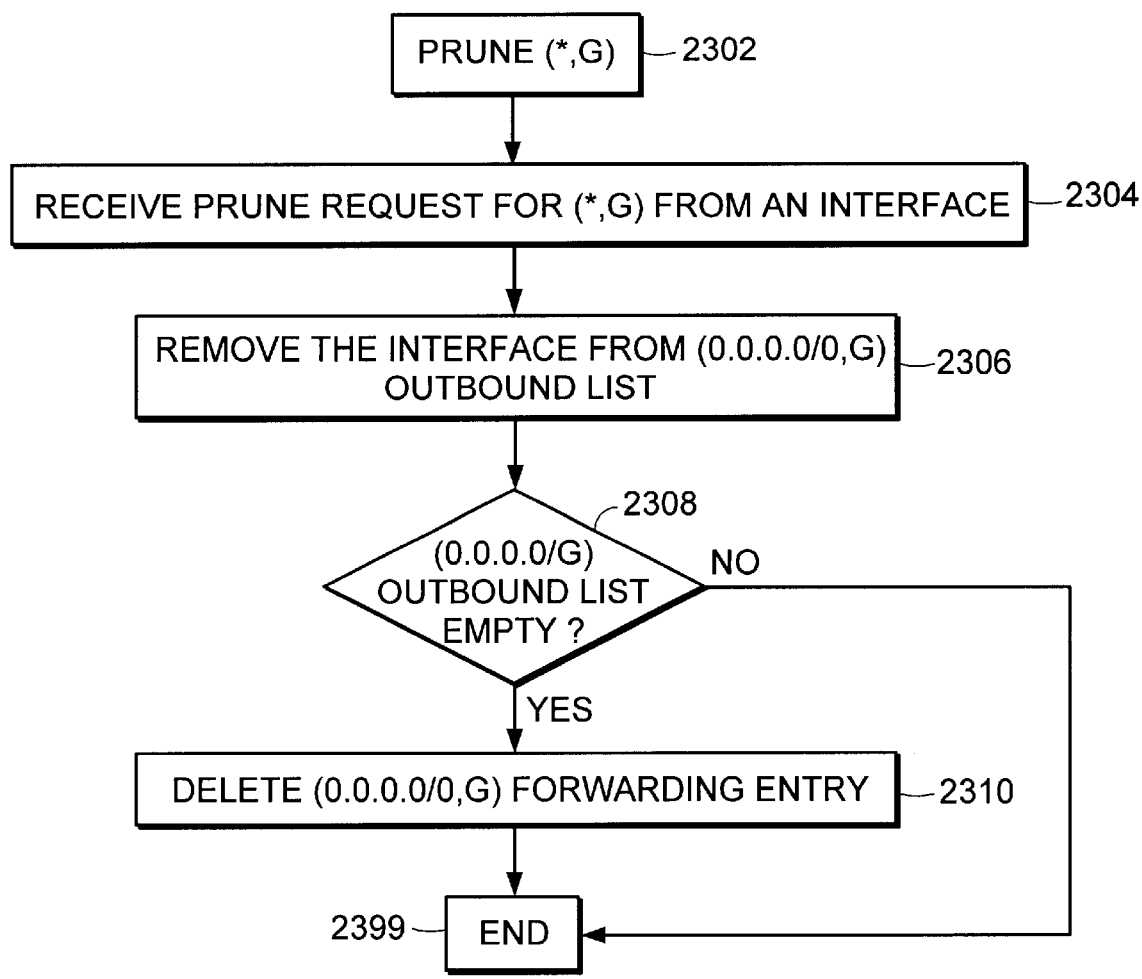
FIG. 23 is a logic flow diagram showing exemplary logic for processing a PIM Prune (*,G) request in accordance with an embodiment of the invention.

FIG. 23 shows exemplary logic 2300 for processing a prune (*,G) request. Beginning at step 2302, and upon receiving the prune (*,G) request from an interface, in step 2304, the logic removes the interface from the (0.0.0.0/0,G) outbound list, in step 2306. The logic then determines whether the resulting (0.0.0.0/0,G) outbound list is empty, in step 2308. If the resulting (0.0.0.0/0,G) outbound list is empty (YES in step 2308), then the logic deletes the (0.0.0.0/0,G) forwarding entry. The logic 2300 terminates in step 2399.

When the router receives a prune (S,G) request from an interface, the router searches for a forwarding entry having a source address range that includes S. For convenience, such a forwarding entry is designated (S2/prefix,G), where S2 is a source address such that S falls within the range defined by S2/prefix. Upon finding the (S2/prefix,G) forwarding entry, the router deletes S from the source list associated with the interface (each SM outbound interface is associated with a source list). If the resulting source list is empty, then the router removes the interface from the (S2/prefix,G) outbound list. If the resulting (S2/prefix,G) outbound list is empty, then the router deletes the (S2/prefix,G) forwarding entry.

Figure 24:
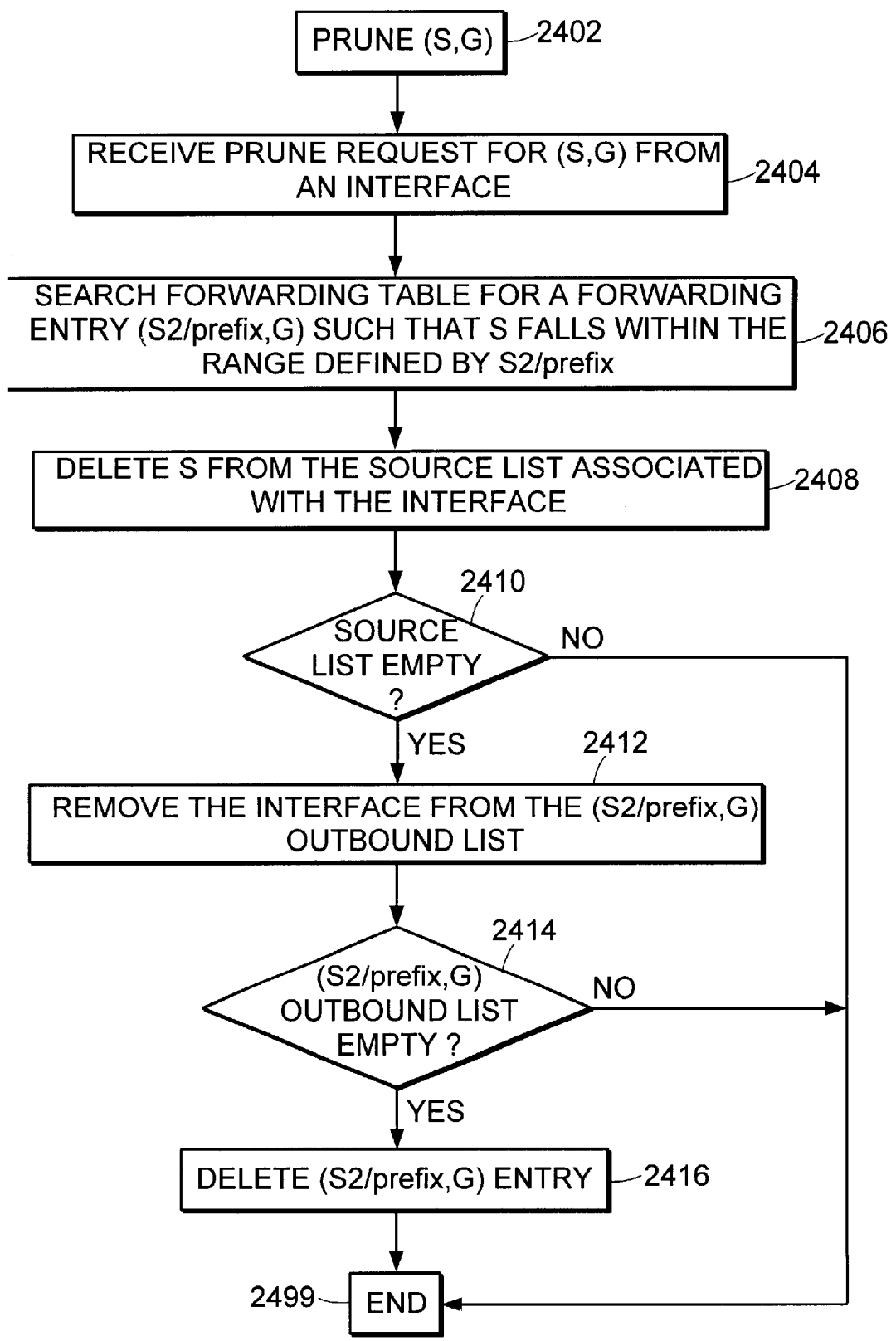
FIG. 24 is a logic flow diagram showing exemplary logic for processing a PIM Prune (S,G) request in accordance with an embodiment of the invention.

FIG. 24 shows exemplary logic 2400 for processing a prune (S,G) request. Beginning at step 2402, and upon receiving the prune (S,G) request from an interface, in step 2404, the logic searches the forwarding table for a forwarding entry (S2/prefix,G) such that S falls within the source address range defined by S2/prefix, in step 2406. Upon finding the (S2/prefix,G) forwarding entry in step 2406, the logic deletes S from the source list associated with the interface, in step 2408, and determines whether the resulting source list is empty, in step 2410. If the resulting source list is empty (YES in step 2410), then the logic removes the interface from the (S2/prefix,G) outbound list, in step 2412, and determines whether the resulting (S2/prefix,G) outbound list is empty, in step 2414. If the resulting (S2/prefix,G) outbound list is empty (YES in step 2414), then the logic deletes the (S2/prefix,G) forwarding entry from the forwarding table, in step 2416. The logic 2400 terminates in step 2499.

When a SM router receives a multicast packet from a SM interface and there is no matching forwarding entry, the SM router need not utilize the CHECK INBOUND (1700) operation to determine whether the interface is an accepted inbound interface. This is because there would already be a matching forwarding entry if at least one downstream multicast group member joined the corresponding multicast distribution tree. Therefore, the SM router can simply drop the packet, or alternatively the SM router can install a forwarding entry with a "drop" bit set. Such a forwarding entry may be used for processing the multicast packet by fast path forwarding logic in the router.

Figure 25:
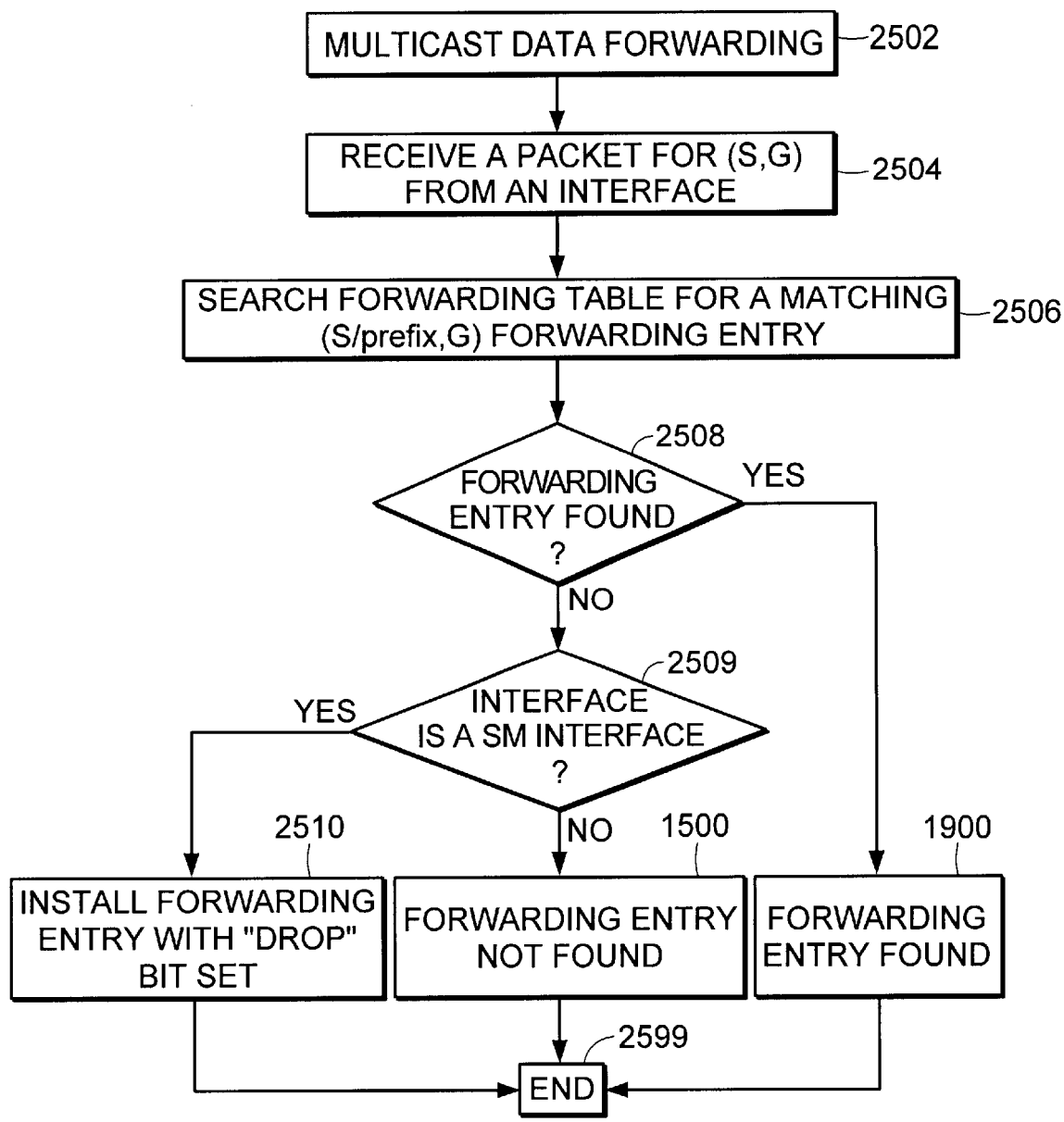
FIG. 25 is a logic flow diagram showing exemplary logic for processing a multicast packet received from a PIM interface in accordance with an embodiment of the invention.

FIG. 25 shows exemplary logic 2500 for processing a multicast packet for (S,G). Beginning at step 2502, and upon receiving a packet for (S,G) from an interface, in step 2504, the logic searches the forwarding table for a matching (S/prefix,G) forwarding entry, in step 2506. If a matching (S/prefix,G) forwarding entry is found (YES in step 2508), then the logic proceeds according to the logic 1900 shown and described with reference to FIG. 19 above. If a matching (S/prefix,G) forwarding entry is not found (NO in step 2508), then the logic determines whether the interface is a SM interface, in step 2509. If the interface is a SM interface (YES in step 2509), then the logic optionally installs a forwarding entry with a "drop" bit set, in step 2510, and terminates in step 2599 without forwarding the multicast packet. If the interface is a non-SM interface (NO in step 2509), then the logic proceeds substantially in accordance with the logic 1500 shown and described with reference to FIG. 15 above, although the logic need only determine non-SM outbound interfaces. The logic 2500 terminates in step 2599.

Figure 26:
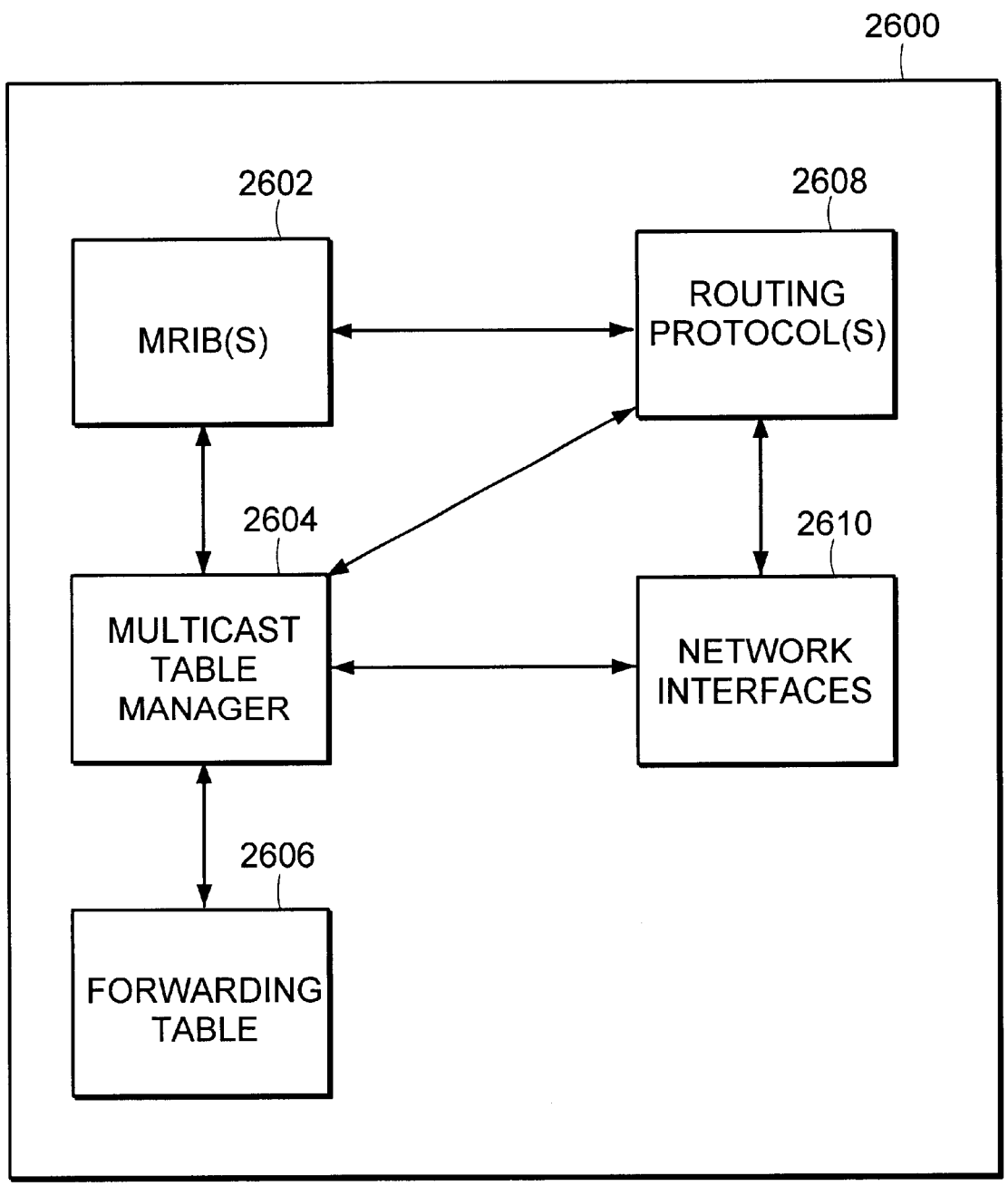
FIG. 26 is a block diagram showing relevant logic blocks of an exemplary multicast router in accordance with an embodiment of the invention.

FIG. 26 is a block diagram showing pertinent logic blocks of an exemplary multicast router 2600. The multicast router 2600 includes one or more MRIBs 2602, a multicast table manager 2604, a forwarding table 2606, one or more routing protocols 2608, and a number of network interfaces 2610. The routing protocol(s) 2608 are coupled to the network interfaces 2610 for determining multicast routes. The routing protocol(s) 2608 store the multicast routes in the MREB(s) 2602, preferably as a number of multi-level enclosing ranges. The multicast table manager 2604 utilizes the routing information from the MRIB(s) 2602 as well as other multicast routing information obtained from the routing protocol(s) 2608 and the network interfaces 2610 to install and maintain forwarding states in the forwarding table 2606.

Although a preferred embodiment of the present invention utilizes a prefix to define the source address range for each forwarding entry, the present invention is in no way limited to any particular technique for defining the source address range for each forwarding entry. There are many alternative techniques for defining the source address range for each forwarding entry, including, but in no way limited to, listing all source addresses in the source address range, including a starting address and ending address for the source address range, or associating each forwarding entry with a mask that defines the significant address bits for the source address range. Other techniques for defining the source address range for each forwarding entry will become apparent to the skilled artisan.

In a preferred embodiment of the present invention, predominantly all of the described logic is implemented as a set of computer program instructions that are stored in a computer readable medium and executed by an embedded microprocessor system within the multicast router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for reducing the number of forwarding states maintained by a multicast routing device. The multicast routing device includes a multicast routing information base (MRIB) defining a number of enclosing ranges for multicast routes, where each enclosing range is characterized by a lower boundary and an upper boundary. Each forwarding state includes a source address (S), a group address (G), an inbound list identifying preferred and rejected inbound interfaces for the forwarding state, and an outbound list identifying outbound interfaces for the forwarding state. The method involves associating with each forwarding state a source address range encompassing at least one source address. A forwarding state having a source address range encompassing all possible source addresses is a default forwarding state, and a forwarding state having a source address range encompassing fewer than all possible source addresses is a non-default forwarding state. The method further involves maintaining the forwarding states such that the source address ranges for all non-default forwarding states are non-overlapping.

The present invention may also be embodied as a device. The device includes a plurality of network interfaces. The device also includes a multicast routing information base (MRIB) for storing multicast routing information including a number of enclosing ranges for multicast routes, where each enclosing range is characterized by a lower boundary and an upper boundary. The device further includes a forwarding table for storing forwarding states, where each forwarding state includes a source address (S), a group address (G), an inbound list identifying preferred and rejected inbound interfaces for the forwarding state, and an outbound list identifying outbound interfaces for the forwarding state. The device also includes routing protocol logic operably coupled to determine multicast routes utilizing the plurality of network interfaces and store the multicast routes the MRIB as well as table management logic responsive to multicast routing information obtained from the MRIB, the routing protocol logic, and the plurality of network interfaces. The table management logic associates with each forwarding state a source address range encompassing at least one source address, wherein a forwarding state having a source address range encompassing all possible source addresses is a default forwarding state and a forwarding state having a source address range encompassing fewer than all possible source addresses is a non-default forwarding state. The table management logic also maintains the forwarding states such that the source address ranges for all non-default forwarding states are non-overlapping.

The present invention may also be embodied in a computer program stored in a computer readable medium for operation in a multicast routing device. The multicast routing device includes a plurality of network interfaces. The multicast routing device also includes a multicast routing information base (MRIB) for storing multicast routing information including a number of enclosing ranges for multicast routes, where each enclosing range is characterized by a lower boundary and an upper boundary. The multicast routing device further includes a forwarding table for storing forwarding states, where each forwarding state includes a source address (S), a group address (G), an inbound list identifying preferred and rejected inbound interfaces for the forwarding state, and an outbound list identifying outbound interfaces for the forwarding state. The computer program includes routing protocol logic for determining multicast routes utilizing the plurality of network interfaces and storing the multicast routes in the MRIB. The computer program also includes table management logic that utilizes multicast routing information obtained from the MRIB, the routing protocol logic, and the plurality of network interfaces. The table management logic associates with each forwarding state a source address range encompassing at least one source address, wherein a forwarding state having a source address range encompassing all possible source addresses is a default forwarding state and a forwarding state having a source address range encompassing fewer than all possible source addresses is a non-default forwarding state. The table management logic also maintains the forwarding states such that the source address ranges for all non-default forwarding states are non-overlapping.

The present invention may be embodied in other specific forms without departing from the essence or essential characteristics. The described embodiments are to be considered in all respects only as illustrative and not restrictive.

We claim:

1. In a multicast routing device having a multicast routing information base (MRIB) defining a number of enclosing ranges for multicast routes, each enclosing range characterized by a lower boundary and an upper boundary, a method for reducing the number of forwarding states maintained by the multicast routing device, each forwarding state including a source address (S), a group address (G), an inbound list identifying preferred and rejected inbound interfaces for the forwarding state, and an outbound list identifying outbound interfaces for the forwarding state, the method comprising:

associating with each forwarding state a source address range encompassing at least one source address, wherein a forwarding state having a source address range encompassing all possible source addresses is a default forwarding state, and a forwarding state having a source address range encompassing fewer than all possible source addresses is a non-default forwarding state; and maintaining the forwarding states such that the source address ranges for all non-default forwarding states are non-overlapping.

2. The method of claim 1, wherein maintaining the forwarding states such that the source address ranges for all non-default forwarding states are non-overlapping comprises:

detecting a multicast route change;

locating a forwarding state having a source address range that is contained in the changed multicast route;

searching in the MRIB to find an enclosing range for S, said enclosing range representing a matching range containing a number of more-specific enclosing ranges; and updating the inbound and outbound interfaces for the forwarding state, if S is not contained in one of the number of more-specific enclosing ranges other than the changed multicast route and the changed multicast route causes the inbound interface for the forwarding state to change from an old inbound interface to a new inbound interface.

3. The method of claim 2, wherein updating the inbound and outbound interfaces for the forwarding state comprises:

changing the old inbound interface to be a rejected inbound interface for the forwarding state;

adding the new inbound interface to be a preferred inbound interface for the forwarding state;

determining whether the new inbound interface was an outbound interface for the forwarding state;

removing the new inbound interface from the forwarding state outbound list, if the new inbound interface was an outbound interface for the forwarding state;

determining whether the old inbound interface is an outbound interface for the forwarding state; and adding the old inbound interface to the forwarding state outbound list, if the old inbound interface is determined to be an outbound interface for the forwarding state.

4. The method of claim 3, wherein determining whether the old inbound interface is an outbound interface for the forwarding state comprises consulting a multicast routing protocol.

5. The method of claim 2, wherein the changed multicast route is a new multicast route, and wherein maintaining the forwarding states such that the source address ranges for all non-default forwarding states are non-overlapping further comprises:

finding a second forwarding state having a source address range that is less-specific than the new multicast route;

determining a new source address range for the second forwarding state; and updating the second forwarding state to use the new source address range.

6. The method of claim 5, wherein determining the new source address range for the second forwarding state comprises:

determining that S is contained in the new multicast route;

setting the new source address range equal to a source address range associated with the multicast route.

7. The method of claim 5, wherein determining the new source address range for the second forwarding state comprises:

determining that S is not contained in the multicast route;

searching in the MRIB to find an enclosing range for S, said enclosing range representing a matching range containing a number of more-specific enclosing ranges;

determining that the matching range contains no more-specific enclosing ranges; and setting the new source address range equal to a source address range associated with the multicast route.

8. The method of claim 5, wherein determining the new source address range for the second forwarding state comprises:

determining that S is not contained in the multicast route;

searching in the MRIB to find an enclosing range for S, said enclosing range representing a matching range containing a number of more-specific enclosing ranges;

determining that the matching range contains at least one more-specific enclosing range; and determining the new source address range such that the new source address range does not overlap with any more-specific enclosing range within the matching range.

9. The method of claim 8, wherein determining the new source address range comprises:

determining a maximum upper boundary within the matching range that is less than or equal to S;

determining a minimum lower boundary within the matching range that is greater than or equal to S; and determining the new source address range such that the lower boundary of the new source address range is greater than or equal to said maximum upper boundary and the upper boundary of the new source address range is less than or equal to said minimum lower boundary.

10. The method of claim 5, wherein updating the second forwarding state to use the new source address range comprises:
   installing a new forwarding state having the new source address range;
   copying the inbound list from the second forwarding state to the new forwarding state;
   copying the outbound list from the second forwarding state to the new forwarding state; and
   deleting the second forwarding state.

11. The method of claim 6, further comprising, after updating the second forwarding state to use the new source address range:
   determining a next hop interface to the new multicast route;
   changing the old inbound interface to be a rejected inbound interface for the updated forwarding state;
   adding the new inbound interface to be a preferred inbound interface for the updated forwarding state;
   determining whether the new inbound interface was an outbound interface for the second forwarding state;
   removing the new inbound interface from the outbound list of the updated forwarding state, if the new inbound interface was an outbound interface for the second forwarding state;
   determining whether the old inbound interface is an outbound interface for the updated forwarding state; and
   adding the old inbound interface to the outbound list of the updated forwarding state, if the old inbound interface is determined to be an outbound interface for the updated forwarding state.

12. The method of claim 1, wherein maintaining the forwarding states such that the source address ranges for all non-default forwarding states are non-overlapping comprises:
   determining a multicast route to be aged;
   searching in the MRIB to find a first enclosing range that contains the aged multicast route;
   locating a forwarding state having a source address range that is contained in the aged multicast route;
   searching in the MRIB to find a second enclosing range that contains S, said second enclosing range representing a matching range containing a number of more-specific enclosing ranges; and
   updating the inbound and outbound interfaces for the forwarding state, if S is not contained in a more-specific enclosing range within the matching range other than the aged multicast route, the first enclosing range that contains the aged multicast route exists, and the aged multicast route causes the inbound interface of the forwarding state to change from an old inbound interface to a new inbound interface.

13. The method of claim 12, wherein updating the inbound and outbound interfaces for the forwarding state comprises:
   changing the old inbound interface to be a rejected inbound interface for the forwarding state;
   adding the new inbound interface to be a preferred inbound interface for the forwarding state;
   determining whether the new inbound interface was an outbound interface for the forwarding state;
   removing the new inbound interface from the outbound list of the forwarding state, if the new inbound interface was an outbound interface for the forwarding state;
   determining whether the old inbound interface is an outbound interface for the forwarding state; and
   adding the old inbound interface to the outbound list of the forwarding state, if the old inbound interface is determined to be an outbound interface for the forwarding state.

14. The method of claim 1, wherein maintaining the forwarding states such that the source address ranges for all non-default forwarding states are non-overlapping comprises:
   receiving a multicast packet for (S,G) from an interface;
   installing a transitional most-specific forwarding state having a source address range encompassing only S;
   determining all inbound and outbound interfaces for the transitional most-specific forwarding state; and
   updating the transitional most-specific forwarding state to use a less-specific source address range, if all inbound and outbound interfaces agree to use the less-specific source address range.

15. The method of claim 1, wherein maintaining the forwarding states such that the source address ranges for all non-default forwarding states are non-overlapping comprises:
   receiving a join (*,G) request from an interface;
   locating a default forwarding state associated with G; and
   adding the interface to the outbound list of the default forwarding state.

16. The method of claim 1, wherein maintaining the forwarding states such that the source address ranges for all non-default forwarding states are non-overlapping comprises:
   receiving a join (*,G) request from an interface;
   installing a default forwarding state associated with G;
   determining a reverse path forwarding interface towards a rendezvous point device; and
   adding the reverse path forwarding interface to the inbound list of the default forwarding state as a preferred inbound interface, if the reverse path forwarding interface is a sparse mode interface.

17. The method of claim 1, wherein maintaining the forwarding states such that the source address ranges for all non-default forwarding states are non-overlapping comprises:
   receiving a join (S,G) request from an interface;
   locating a forwarding state having a source address range containing S; and
   adding the interface to the outbound list of the forwarding state.

18. The method of claim 1, wherein maintaining the forwarding states such that the source address ranges for all non-default forwarding states are non-overlapping comprises:
   receiving a join (S,G) request from an interface;
   determining a non-overlapping source address range for (S,G);
   installing a forwarding state for (S,G) having said non-overlapping source address range;
   copying the inbound list from a default forwarding state to the forwarding state for (S,G);
   copying the outbound list from the default forwarding state to the forwarding state for (S,G); and
   adding the interface to the outbound list of the forwarding state.

19. The method of claim 1, wherein maintaining the forwarding states such that the source address ranges for all non-default forwarding states are non-overlapping comprises:

receiving a prune (*,G) request from an interface;

locating a default forwarding state associated with G;

removing the interface from the outbound list of the default forwarding state; and deleting the default forwarding state, if the outbound list of the default forwarding state is empty.

20. The method of claim 1, wherein maintaining the forwarding states such that the source address ranges for all non-default forwarding states are non-overlapping comprises:

receiving a prune (S,G) request from an interface;

locating a forwarding state having a source address range containing S, said forwarding state including a source list for each outbound interface in the outbound list;

deleting S from the source list associated with the interface;

removing the interface from the outbound list of the forwarding state, if the source list is empty; and deleting the forwarding state, if the outbound list of the forwarding state is empty.

21. The method of claim 1, wherein maintaining the forwarding states such that the source address ranges for all non-default forwarding states are non-overlapping comprises:

receiving a multicast packet for (S,G) from a sparse mode interface;

failing to locate a forwarding state having a source address range containing S; and dropping the multicast packet without checking whether the sparse mode interface is an accepted inbound interface for (S,G).

22. The method of claim 21, further comprising:

installing a forwarding state for (S,G), the forwarding state including a "drop"indicator indicating that all multicast packets for (S,G) should be dropped.

23. The method of claim 1, wherein associating a source address range with a forwarding state comprises assigning a prefix to the forwarding state, the source address S and the prefix together defining the source address range for the forwarding state, such that a forwarding state having a prefix of zero (0) is a default forwarding state having a source address range encompassing all possible source addresses, and a forwarding state having a prefix greater than zero (0) is a non-default forwarding state having a source address range encompassing fewer than all possible source addresses.

24. The method of claim 23, wherein assigning a prefix to the forwarding state comprises:

searching the MRIB for a most-specific enclosing range that includes S, said most-specific enclosing range representing a matching range including a number of more-specific enclosing ranges; and assigning the prefix to the forwarding state such that the source address range defined by the source address S and the prefix does not overlap with any of said more-specific enclosing ranges.

25. The method of claim 23, wherein maintaining the forwarding states such that the source address ranges for all non-default forwarding states are non-overlapping comprises:

detecting a multicast route change;

locating a forwarding state (S/prefix,G) such that the source address range defined by S/prefix is contained in the changed multicast route;

searching in the MRIB to find an enclosing range for S, said enclosing range representing a matching range containing a number of more-specific enclosing ranges; and updating the (S/prefix,G) inbound and outbound interfaces, if S is not contained in one of the number of more-specific enclosing ranges other than the changed multicast route and the changed multicast route causes the (S/prefix,G) inbound interface to change from an old inbound interface to a new inbound interface.

26. The method of claim 25, wherein updating the (S/prefix,G) inbound and outbound interfaces comprises:

changing the old inbound interface to be a rejected inbound interface for the (S/prefix,G) forwarding state;

adding the new inbound interface to be a preferred inbound interface for the (S/prefix,G) forwarding state;

determining whether the new inbound interface was an outbound interface for the (S/prefix,G) forwarding state;

removing the new inbound interface from the (S/prefix,G) outbound list, if the new inbound interface was an outbound interface for the (S/prefix,G) forwarding state;

determining whether the old inbound interface is an outbound interface for the (S/prefix,G) forwarding state; and adding the old inbound interface to the (S/prefix,G) outbound list, if the old inbound interface is determined to be an outbound interface for the (S/prefix,G) forwarding state.

27. The method of claim 25, wherein the modified multicast route is a new multicast route, and wherein maintaining the forwarding states such that the source address ranges for all non-default forwarding states are non-overlapping further comprises:

finding a second forwarding state having a source address range that is less-specific than the new multicast route;

determining a new prefix for the second forwarding state; and re-prefixing the second forwarding state from an old prefix to the new prefix.

28. The method of claim 27, wherein determining the new prefix for the second forwarding state comprises:

determining that S is contained in the new multicast route;

setting the new prefix equal to a prefix associated with the new multicast route.

29. The method of claim 27, wherein determining the new prefix for the second forwarding state comprises:

determining that S is not contained in the new multicast route;

searching in the MRIB to find an enclosing range for S, said enclosing range representing a matching range containing a number of more-specific enclosing ranges;

determining that the matching range contains no more-specific enclosing ranges; and setting the new prefix equal to a prefix associated with the matching range.

30. The method of claim 27, wherein determining the new prefix for the second forwarding state comprises:

determining that S is not contained in the new multicast route;

searching in the MRIB to find an enclosing range for S, said enclosing range representing a matching range containing a number of more-specific enclosing ranges;

determining that the matching range contains at least one more-specific enclosing range; and determining the new prefix such that the source address range defined by S/prefix does not overlap with any more-specific enclosing range within the matching range.

31. The method of claim 30, wherein determining the new prefix comprises:

determining a maximum upper boundary within the matching range that is less than or equal to S;

determining a minimum lower boundary within the matching range that is greater than or equal to S; and determining the new prefix such that the lower boundary of the source address range defined by S/prefix is greater than or equal to said maximum upper boundary and the upper boundary of the source address range defined by S/prefix is less than or equal to said minimum lower boundary.

32. The method of claim 31, wherein determining the new prefix such that the lower boundary of the source address range defined by S/prefix is greater than or equal to said maximum upper boundary and the upper boundary of the source address range defined by S/prefix is less than or equal to said minimum lower boundary comprises determining the minimum prefix such that the lower boundary of the source address range defined by S/prefix is greater than or equal to said maximum upper boundary and the upper boundary of the source address range defined by S/prefix is less than or equal to said minimum lower boundary.

33. The method of claim 27, wherein re-prefixing the second forwarding state from the old prefix to the new prefix comprises:

installing a new forwarding state (S/NewPrefix,G) for (S,G), where NewPrefix is the new prefix;

copying the inbound list from the second forwarding state to the (S/NewPrefix,G) inbound list;

copying the outbound list from the second forwarding state to the (S/NewPrefix,G) outbound list; and deleting the second forwarding state.

34. The method of claim 28, further comprising, after re-prefixing the second forwarding state from an old prefix to the new prefix:

determining a next hop interface to the new multicast route;

changing the old inbound interface to be a rejected inbound interface for the re-prefixed forwarding state;

adding the new inbound interface to be a preferred inbound interface for the re-prefixed forwarding state;

determining whether the new inbound interface was an outbound interface for the second forwarding state;

removing the new inbound interface from the outbound list of the re-prefixed forwarding state, if the new inbound interface was an outbound interface for the second forwarding state;

determining whether the old inbound interface is an outbound interface for the re-prefixed forwarding state; and adding the old inbound interface to the outbound list of the re-prefixed forwarding state, if the old inbound interface is determined to be an outbound interface for the re-prefixed forwarding state.

35. The method of claim 23, wherein maintaining the forwarding states such that the source address ranges for all non-default forwarding states are non-overlapping comprises:

determining a multicast route to be aged;

searching in the MRIB to find a first enclosing range that contains the aged multicast route;

locating a forwarding state (S/prefix,G) such that the source address range defined by S/prefix is contained in the aged multicast route;

searching in the MRIB to find a second enclosing range that contains S, said second enclosing range representing a matching range containing a number of more-specific enclosing ranges; and updating the (S/prefix,G) inbound and outbound interfaces, if S is not contained in a more-specific enclosing range within the matching range other than the aged multicast route, the first enclosing range that contains the aged multicast route exists, and the aged multicast route causes the (S/prefix,G) inbound interface to change from an old inbound interface to a new inbound interface.

36. The method of claim 35, wherein updating the (S/prefix,G) inbound and outbound interfaces comprises:

changing the old inbound interface to be a rejected inbound interface for the (S/prefix,G) forwarding state;

adding the new inbound interface to be a preferred inbound interface for the (S/prefix,G) forwarding state;

determining whether the new inbound interface was an outbound interface for the (S/prefix,G) forwarding state;

removing the new inbound interface from the (S/prefix,G) outbound list, if the new inbound interface was an outbound interface for the (S/prefix,G) forwarding state;

determining whether the old inbound interface is an outbound interface for the (S/prefix,G) forwarding state; and adding the old inbound interface to the (S/prefix,G) outbound list, if the old inbound interface is determined to be an outbound interface for the (S/prefix,G) forwarding state.

37. The method of claim 23, wherein maintaining the forwarding states such that the source address ranges for all non-default forwarding states are non-overlapping comprises:

receiving a multicast packet for (S,G) from an interface;

installing a transitional most-specific forwarding state having a source address range defined by S/prefix encompassing only S;

determining all inbound and outbound interfaces for the transitional most-specific forwarding state; and re-prefixing the transitional most-specific forwarding state to use a less-specific prefix, if all inbound and outbound interfaces agree to use the less-specific prefix.

38. The method of claim 37, wherein the transitional most-specific forwarding state is assigned a prefix equal to thirty-two (32).

39. The method of claim 23, wherein maintaining the forwarding states such that the source address ranges for all non-default forwarding states are non-overlapping comprises:

receiving a join (*,G) request from an interface;

locating a default forwarding state (0.0.0.0/0,G); and adding the interface to the (0.0.0.0/0,G) outbound list.

40. The method of claim 23, wherein maintaining the forwarding states such that the source address ranges for all non-default forwarding states are non-overlapping comprises:

receiving a join (*,G) request from an interface;

installing a default forwarding state (0.0.0.0/0,G);

determining a reverse path forwarding interface towards a rendezvous point device; and adding the reverse path forwarding interface to the (0.0.0.0/0,G) inbound list as a referred inbound interface, if the reverse path forwarding interface is a sparse mode interface.

41. The method of claim 23, wherein maintaining the forwarding states such that the source address ranges for all non-default forwarding states are non-overlapping comprises:

receiving a join (S,G) request from an interface;

locating a forwarding state having a source address range containing S; and adding the interface to the outbound list of the forwarding state.

42. The method of claim 23, wherein maintaining the forwarding states such that the source address ranges for all non-default forwarding states are non-overlapping comprises:

receiving a join (S,G) request from an interface;

computing a prefix for S;

installing a forwarding state for (S/prefix,G);

copying the inbound list from a default forwarding state (0.0.0.0/0,G) to the (S/prefix,G) inbound list;

copying the outbound list from a default forwarding state (0.0.0.0/0,G) to the (S/prefix,G) outbound list; and adding the interface to the (S/prefix,G) outbound list.

43. The method of claim 23, wherein maintaining the forwarding states such that the source address ranges for all non-default forwarding states are non-overlapping comprises:

receiving a prune (*,G) request from an interface;

locating a default forwarding state (0.0.0.0/0,G);

removing the interface from the (0.0.0.0/0,G) outbound list; and deleting the default forwarding state (0.0.0.0/0,G), if the (0.0.0.0/0,G) outbound list is empty.

44. The method of claim 23, wherein maintaining the forwarding states such that the source address ranges for all non-default forwarding states are non-overlapping comprises:

receiving a prune (S,G) request from an interface;

locating a forwarding state having a source address range containing S, said forwarding state including a source list for each outbound interface in the outbound list;

deleting S from the source list associated with the interface;

removing the interface from the outbound list of the forwarding state, if the source list is empty; and deleting the forwarding state, if the outbound list of the forwarding state is empty.

45. The method of claim 23, wherein maintaining the forwarding states such that the source address ranges for all non-default forwarding states are non-overlapping comprises:

receiving a multicast packet for (S,G) from a sparse mode interface;

failing to locate a forwarding state having a source address range containing S; and dropping the multicast packet without checking whether the sparse mode interface is an accepted inbound interface for (S,G).

46. The method of claim 45, further comprising:

installing a forwarding state for (S,G), the forwarding state including a "drop" indicator indicating that all multicast packets for (S,G) should be dropped.

47. A device comprising:

a plurality of network interfaces;

a multicast routing information base (MRIB) for storing multicast routing information including a number of enclosing ranges for multicast routes, each enclosing range characterized by a lower boundary and an upper boundary;

a forwarding table for storing forwarding states, each forwarding state including a source address (S), a group address (G), an inbound list identifying preferred and rejected inbound interfaces for the forwarding state, and an outbound list identifying outbound interfaces for the forwarding state;

routing protocol logic operably coupled to determine multicast routes utilizing the plurality of network interfaces and store the multicast routes in the MRIB; and table management logic responsive to multicast routing information obtained from the MRIB, the routing protocol logic, and the plurality of network interfaces, the table management logic operably coupled to associate with each forwarding state a source address range encompassing at least one source address, wherein a forwarding state having a source address range encompassing all possible source addresses is a default forwarding state and a forwarding state having a source address range encompassing fewer than all possible source addresses is a non-default forwarding state, and to maintain the forwarding states such that the source address ranges for all non-default forwarding states are non-overlapping.

48. The device of claim 47, wherein maintaining the forwarding states such that the source address ranges for all non-default forwarding states are non-overlapping comprises:

detecting a multicast route change;

locating in the forwarding table a forwarding state having a source address range that is contained in the changed multicast route;

searching in the MRIB to find an enclosing range for S, said enclosing range representing a matching range containing a number of more-specific enclosing ranges; and updating the inbound and outbound interfaces for the forwarding state, if S is not contained in one of the number of more-specific enclosing ranges other than the changed multicast route and the changed multicast route causes the inbound interface for the forwarding state to change from an old inbound interface to a new inbound interface.

49. The device of claim 48, wherein updating the inbound and outbound interfaces for the forwarding state comprises:

changing the old inbound interface to be a rejected inbound interface for the forwarding state;

adding the new inbound interface to be a preferred inbound interface for the forwarding state;

determining whether the new inbound interface was an outbound interface for the forwarding state;

removing the new inbound interface from the forwarding state outbound list, if the new inbound interface was an outbound interface for the forwarding state;

determining whether the old inbound interface is an outbound interface for the forwarding state; and adding the old inbound interface to the forwarding state outbound list, if the old inbound interface is determined to be an outbound interface for the forwarding state.

50. The device of claim 49, wherein determining whether the old inbound interface is an outbound interface for the forwarding state comprises consulting the routing protocol logic.

51. The device of claim 48, wherein the changed multicast route is a new multicast route, and wherein maintaining the forwarding states such that the source address ranges for all non-default forwarding states are non-overlapping further comprises:

finding in the forwarding table a second forwarding state having a source address range that is less-specific than the new multicast route;

determining a new source address range for the second forwarding state; and updating the second forwarding state to use the new source address range.

52. The device of claim 50, wherein determining the new source address range for the second forwarding state comprises:

determining that S is contained in the new multicast route;

setting the new source address range equal to a source address range associated with the multicast route.

53. The device of claim 50, wherein determining the new source address range for the second forwarding state comprises:

determining that S is not contained in the multicast route;

searching in the MRIB to find an enclosing range for S, said enclosing range representing a matching range containing a number of more-specific enclosing ranges;

determining that the matching range contains no more-specific enclosing ranges; and setting the new source address range equal to a source address range associated with the multicast route.

54. The device of claim 50, wherein determining the new source address range for the second forwarding state comprises:

determining that S is not contained in the multicast route;

searching in the MRIB to find an enclosing range for S, said enclosing range representing a matching range containing a number of more-specific enclosing ranges;

determining that the matching range contains at least one more-specific enclosing range; and determining the new source address range such that the new source address range does not overlap with any more-specific enclosing range within the matching range.

55. The device of claim 54, wherein determining the new source address range comprises:

determining a maximum upper boundary within the matching range that is less than or equal to S;

determining a minimum lower boundary within the matching range that is greater than or equal to S; and determining the new source address range such that the lower boundary of the new source address range is greater than or equal to said maximum upper boundary and the upper boundary of the new source address range is less than or equal to said minimum lower boundary.

56. The device of claim 50, wherein updating the second forwarding state to use the new source address range comprises:

installing in the forwarding table a new forwarding state having the new source address range;

copying the inbound list from the second forwarding state to the new forwarding state;

copying the outbound list from the second forwarding state to the new forwarding state; and deleting the second forwarding state from the forwarding table.

57. The device of claim 51, further comprising, after updating the second forwarding state to use the new source address range:

consulting the routing protocol logic to determine a next hop interface to the new multicast route;

changing the old inbound interface to be a rejected inbound interface for the updated forwarding state;

adding the new inbound interface to be a preferred inbound interface for the updated forwarding state;

determining whether the new inbound interface was an outbound interface for the second forwarding state;

removing the new inbound interface from the outbound list of the updated forwarding state, if the new inbound interface was an outbound interface for the second forwarding state;

determining whether the old inbound interface is an outbound interface for the updated forwarding state; and adding the old inbound interface to the outbound list of the updated forwarding state, if the old inbound interface is determined to be an outbound interface for the updated forwarding state.

58. The device of claim 47, wherein maintaining the forwarding states such that the source address ranges for all non-default forwarding states are non-overlapping comprises:

determining a multicast route to be aged;

searching in the MRIB to find a first enclosing range that contains the aged multicast route;

locating in the forwarding table a forwarding state having a source address range that is contained in the aged multicast route;

searching in the MRIB to find a second enclosing range that contains S, said second enclosing range representing a matching range containing a number of more-specific enclosing ranges; and updating the inbound and outbound interfaces for the forwarding state, if S is not contained in a more-specific enclosing range within the matching range other than the aged multicast route, the first enclosing range that contains the aged multicast route exists, and the aged multicast route causes the inbound interface of the forwarding state to change from an old inbound interface to a new inbound interface.

59. The device of claim 58, wherein updating the inbound and outbound interfaces for the forwarding state comprises:

changing the old inbound interface to be a rejected inbound interface for the forwarding state;

adding the new inbound interface to be a preferred inbound interface for the forwarding state;

determining whether the new inbound interface was an outbound interface for the forwarding state;

removing the new inbound interface from the outbound list of the forwarding state, if the new inbound interface was an outbound interface for the forwarding state;

determining whether the old inbound interface is an outbound interface for the forwarding state; and adding the old inbound interface to the outbound list of the forwarding state, if the old inbound interface is determined to be an outbound interface for the forwarding state.

60. The device of claim 47, wherein maintaining the forwarding states such that the source address ranges for all non-default forwarding states are non-overlapping comprises:

receiving a multicast packet for (S,G) from one of the plurality of network interfaces;

installing in the forwarding table a transitional most-specific forwarding state having a source address range encompassing only S;

determining all inbound and outbound interfaces for the transitional most-specific forwarding state; and updating the transitional most-specific forwarding state to use a less-specific source address range, if all inbound and outbound interfaces agree to use the less-specific source address range.

61. The device of claim 47, wherein maintaining the forwarding states such that the source address ranges for all non-default forwarding states are non-overlapping comprises:

receiving a join (*,G) request from one of the plurality of network interfaces;

locating in the forwarding table a default forwarding state associated with G; and adding the network interface to the outbound list of the default forwarding state.

62. The device of claim 47, wherein maintaining the forwarding states such that the source address ranges for all non-default forwarding states are non-overlapping comprises:

receiving a join (*,G) request from one of the plurality of network interfaces;

installing in the forwarding table a default forwarding state associated with G;

consulting the routing protocol logic to determine a reverse path forwarding interface towards a rendezvous point device; and adding the reverse path forwarding interface to the inbound list of the default forwarding state as a preferred inbound interface, if the reverse path forwarding interface is a sparse mode interface.

63. The device of claim 47, wherein maintaining the forwarding states such that the source address ranges for all non-default forwarding states are non-overlapping comprises:

receiving a join (S,G) request from one of the plurality of network interfaces; locating in the forwarding table a forwarding state having a source address range containing S; and adding the network interface to the outbound list of the forwarding state.

64. The device of claim 47, wherein maintaining the forwarding states such that the source address ranges for all non-default forwarding states are non-overlapping comprises:

receiving a join (S,G) request from one of the plurality of network interfaces;

determining a non-overlapping source address range for (S,G);

installing in the forwarding table a forwarding state for (S,G) having said non-overlapping source address range;

copying the inbound list from a default forwarding state to the forwarding state for (S,G);

copying the outbound list from the default forwarding state to the forwarding state for (S,G); and adding the interface to the outbound list of the forwarding state.

65. The device of claim 47, wherein maintaining the forwarding states such that the source address ranges for all non-default forwarding states are non-overlapping comprises:

receiving a prune (*,G) request from one of the plurality of network interfaces;

locating in the forwarding table a default forwarding state associated with G;

removing the interface from the outbound list of the default forwarding state; and deleting the default forwarding state from the forwarding table, if the outbound list of the default forwarding state is empty.

66. The device of claim 47, wherein maintaining the forwarding states such that the source address ranges for all non-default forwarding states are non-overlapping comprises:

receiving a prune (S,G) request from one of the plurality of network interfaces;

locating in the forwarding table a forwarding state having a source address range containing S, said forwarding state including a source list for each outbound interface in the outbound list;

deleting S from the source list associated with the interface;

removing the interface from the outbound list of the forwarding state, if the source list is empty; and deleting the forwarding state from the forwarding table, if the outbound list of the forwarding state is empty.

67. The device of claim 47, wherein maintaining the forwarding states such that the source address ranges for all non-default forwarding states are non-overlapping comprises:

receiving a multicast packet for (S,G) from a sparse mode interface;

failing to locate a forwarding state in the forwarding table having a source address range containing S; and dropping the multicast packet without consulting the routing protocol logic to determine whether the sparse mode interface is an accepted inbound interface for (S,G).

68. The device of claim 67, further comprising:

installing in the forwarding table a forwarding state for (S,G), the forwarding state including a "drop" indicator indicating that all multicast packets for (S,G) should be dropped.

69. The device of claim 47, wherein associating a source address range with a forwarding state comprises assigning a prefix to the forwarding state, the source address S and the prefix together defining the source address range for the forwarding state, such that a forwarding state having a prefix of zero (0) is a default forwarding state having a source address range encompassing all possible source addresses, and a forwarding state having a prefix greater than zero (0) is a non-default forwarding state having a source address range encompassing fewer than all possible source addresses.

70. The device of claim 69, wherein assigning a prefix to the forwarding state comprises:

searching the MRIB for a most-specific enclosing range that includes S, said most-specific enclosing range representing a matching range including a number of more-specific enclosing ranges; and assigning the prefix to the forwarding state such that the source address range defined by the source address S and the prefix does not overlap with any of said more-specific enclosing ranges.

71. The device of claim 69, wherein maintaining the forwarding states such that the source address ranges for all non-default forwarding states are non-overlapping comprises:

detecting a multicast route change;

locating in the forwarding table a forwarding state (S/prefix,G) such that the source address range defined by S/prefix is contained in the changed multicast route;

searching in the MRIB to find an enclosing range for S, said enclosing range representing a matching range containing a number of more-specific enclosing ranges; and updating the (S/prefix,G) inbound and outbound interfaces, if S is not contained in one of the number of more-specific enclosing ranges other than the changed multicast route and the changed multicast route causes the (S/prefix,G) inbound interface to change from an old inbound interface to a new inbound interface.

72. The device of claim 71, wherein updating the (S/prefix,G) inbound and outbound interfaces comprises:

changing the old inbound interface to be a rejected inbound interface for the (S/prefix,G) forwarding state;

adding the new inbound interface to be a preferred inbound interface for the (S/prefix,G) forwarding state;

determining whether the new inbound interface was an outbound interface for the (S/prefix,G) forwarding state;

removing the new inbound interface from the (S/prefix,G) outbound list, if the new inbound interface was an outbound interface for the (S/prefix,G) forwarding state;

determining whether the old inbound interface is an outbound interface for the (S/prefix,G) forwarding state; and adding the old inbound interface to the (S/prefix,G) outbound list, if the old inbound interface is determined to be an outbound interface for the (S/prefix,G) forwarding state.

73. The device of claim 71, wherein the modified multicast route is a new multicast route, and wherein maintaining the forwarding states such that the source address ranges for all non-default forwarding states are non-overlapping further comprises:

finding in the forwarding table a second forwarding state having a source address range that is less-specific than the new multicast route;

determining a new prefix for the second forwarding state; and re-prefixing the second forwarding state from an old prefix to the new prefix.

74. The device of claim 73, wherein determining the new prefix for the second forwarding state comprises:

determining that S is contained in the new multicast route;

setting the new prefix equal to a prefix associated with the new multicast route.

75. The device of claim 73, wherein determining the new prefix for the second forwarding state comprises:

determining that S is not contained in the new multicast route;

searching in the MRIB to find an enclosing range for S, said enclosing range representing a matching range containing a number of more-specific enclosing ranges;

determining that the matching range contains no more-specific enclosing ranges; and setting the new prefix equal to a prefix associated with the matching range.

76. The device of claim 73, wherein determining the new prefix for the second forwarding state comprises:

determining that S is not contained in the new multicast route;

searching in the MRIB to find an enclosing range for S, said enclosing range representing a matching range containing a number of more-specific enclosing ranges;

determining that the matching range contains at least one more-specific enclosing range; and determining the new prefix such that the source address range defined by S/prefix does not overlap with any more-specific enclosing range within the matching range.

77. The device of claim 76, wherein determining the new prefix comprises:

determining a maximum upper boundary within the matching range that is less than or equal to S;

determining a minimum lower boundary within the matching range that is greater than or equal to S; and determining the new prefix such that the lower boundary of the source address range defined by S/prefix is greater than or equal to said maximum upper boundary and the upper boundary of the source address range defined by S/prefix is less than or equal to said minimum lower boundary.

78. The device of claim 77, wherein determining the new prefix such that the lower boundary of the source address range defined by S/prefix is greater than or equal to said maximum upper boundary and the upper boundary of the source address range defined by S/prefix is less than or equal to said minimum lower boundary comprises determining the minimum prefix such that the lower boundary of the source address range defined by S/prefix is greater than or equal to said maximum upper boundary and the upper boundary of the source address range defined by S/prefix is less than or equal to said minimum lower boundary.

79. The device of claim 73, wherein re-prefixing the second forwarding state from the old prefix to the new prefix comprises:

installing in the forwarding table a new forwarding state (S/NewPrefix,G) for (S,G), where NewPrefix is the new prefix;

copying the inbound list from the second forwarding state to the (S/NewPrefix,G) inbound list;

copying the outbound list from the second forwarding state to the (S/NewPrefix,G) outbound list; and deleting the second forwarding state from the forwarding table.

80. The device of claim 74, further comprising, after re-prefixing the second forwarding state from an old prefix to the new prefix:

consulting the routing protocol logic to determine a next hop interface to the new multicast route;

changing the old inbound interface to be a rejected inbound interface for the re-prefixed forwarding state;

adding the new inbound interface to be a preferred inbound interface for the re-prefixed forwarding state;

determining whether the new inbound interface was an outbound interface for the second forwarding state;

removing the new inbound interface from the outbound list of the re-prefixed forwarding state, if the new inbound interface was an outbound interface for the second forwarding state;

determining whether the old inbound interface is an outbound interface for the re-prefixed forwarding state; and adding the old inbound interface to the outbound list of the re-prefixed forwarding state, if the old inbound interface is determined to be an outbound interface for the re-prefixed forwarding state.

81. The device of claim 69, wherein maintaining the forwarding states such that the source address ranges for all non-default forwarding states are non-overlapping comprises:

determining a multicast route to be aged;

searching in the MRIB to find a first enclosing range that contains the aged multicast route;

locating in the forwarding table a forwarding state (S/prefix,G) such that the source address range defined by S/prefix is contained in the aged multicast route;

searching in the MRIB to find a second enclosing range that contains S, said second enclosing range representing a matching range containing a number of more-specific enclosing ranges; and updating the (S/prefix,G) inbound and outbound interfaces, if S is not contained in a more-specific enclosing range within the matching range other than the aged multicast route, the first enclosing range that contains the aged multicast route exists, and the aged multicast route causes the (S/prefix,G) inbound interface to change from an old inbound interface to a new inbound interface.

82. The device of claim 81, wherein updating the (S/prefix,G) inbound and outbound interfaces comprises:

changing the old inbound interface to be a rejected inbound interface for the (S/prefix,G) forwarding state;

adding the new inbound interface to be a preferred inbound interface for the (S/prefix,G) forwarding state;

determining whether the new inbound interface was an outbound interface for the (S/prefix,G) forwarding state;

removing the new inbound interface from the (S/prefix,G) outbound list, if the new inbound interface was an outbound interface for the (S/prefix,G) forwarding state;

determining whether the old inbound interface is an outbound interface for the (S/prefix,G) forwarding state; and adding the old inbound interface to the (S/prefix,G) outbound list, if the old inbound interface is determined to be an outbound interface for the (S/prefix,G) forwarding state.

83. The device of claim 69, wherein maintaining the forwarding states such that the source address ranges for all non-default forwarding states are non-overlapping comprises:

receiving a multicast packet for (S,G) from one of the plurality of network interfaces;

installing in the forwarding table a transitional most-specific forwarding state having a source address range defined by S/prefix encompassing only S;

determining all inbound and outbound interfaces for the transitional most-specific forwarding state; and re-prefixing the transitional most-specific forwarding state to use a less-specific prefix, if all inbound and outbound interfaces agree to use the less-specific prefix.

84. The device of claim 83, wherein the transitional most-specific forwarding state is assigned a prefix equal to thirty-two (32).

85. The device of claim 69, wherein maintaining the forwarding states such that the source address ranges for all non-default forwarding states are non-overlapping comprises:

receiving a join (*,G) request from one of the plurality of network interfaces;

locating in the forwarding table a default forwarding state (0.0.0.0/0,G); and adding the interface to the (0.0.0.0/0,G) outbound list.

86. The device of claim 69, wherein maintaining the forwarding states such that the source address ranges for all non-default forwarding states are non-overlapping comprises:

receiving a join (*,G) request from one of the plurality of network interfaces;

installing in the forwarding table a default forwarding state (0.0.0.0/0,G);

consulting the routing protocol logic to determine a reverse path forwarding interface towards a rendezvous point device; and adding the reverse path forwarding interface to the (0.0.0.0/0,G) inbound list as a preferred inbound interface, if the reverse path forwarding interface is a sparse mode interface.

87. The device of claim 69, wherein maintaining the forwarding states such that the source address ranges for all non-default forwarding states are non-overlapping comprises:

receiving a join (S,G) request from one of the plurality of network interfaces;

locating in the forwarding table a forwarding state having a source address range containing S; and adding the interface to the outbound list of the forwarding state.

88. The device of claim 69, wherein maintaining the forwarding states such that the source address ranges for all non-default forwarding states are non-overlapping comprises:

receiving a join (S,G) request from one of the plurality of network interfaces;

computing a prefix for S;

installing in the forwarding table a forwarding state for (S/prefix,G);

copying the inbound list from a default forwarding state (0.0.0.0/0,G) to the (S/prefix,G) inbound list;

copying the outbound list from a default forwarding state (0.0.0.0/0,G) to the (S/prefix,G) outbound list; and adding the interface to the (S/prefix,G) outbound list.

89. The device of claim 69, wherein maintaining the forwarding states such that the source address ranges for all non-default forwarding states are non-overlapping comprises:

receiving a prune (*,G) request from one of the plurality of network interfaces;

locating in the forwarding table a default forwarding state (0.0.0.0/0,G);

removing the interface from the (0.0.0.0/0,G) outbound list; and deleting the default forwarding state (0.0.0.0/0,G) from the forwarding table, if the (0.0.0.0/0,G) outbound list is empty.

90. The device of claim 69, wherein maintaining the forwarding states such that the source address ranges for all non-default forwarding states are non-overlapping comprises:
   receiving a prune (S,G) request from one of the plurality of network interfaces;
   locating in the forwarding table a forwarding state having a source address range containing S, said forwarding state including a source list for each outbound interface in the outbound list;
   deleting S from the source list associated with the interface;
   removing the interface from the outbound list of the forwarding state, if the source list is empty; and
   deleting the forwarding state from the forwarding table, if the outbound list of the forwarding state is empty.

91. The device of claim 69, wherein maintaining the forwarding states such that the source address ranges for all non-default forwarding states are non-overlapping comprises:
   receiving a multicast packet for (S,G) from a sparse mode interface;
   failing to locate a forwarding state in the forwarding table having a source address range containing S; and
   dropping the multicast packet without consulting with the routing protocol logic to determine whether the sparse mode interface is an accepted inbound interface for (S,G).

92. The device of claim 91, further comprising:
   installing in the forwarding table a forwarding state for (S,G), the forwarding state including a "drop" indicator indicating that all multicast packets for (S,G) should be dropped.

93. A program product comprising a computer readable medium having embodied therein a computer program for reducing the number of forwarding states in a multicast routing device, the multicast routing device having a forwarding table for storing forwarding states, each forwarding state including a source address (S), a group address (G), an inbound list identifying preferred and rejected inbound interfaces for the forwarding state, and an outbound list identifying outbound interfaces for the forwarding state, and a multicast routing information base (MRIB) for storing multicast routing information including a number of enclosing ranges for multicast routes, each enclosing range characterized by a lower boundary and an upper boundary, the computer program comprising:
   routing protocol logic operably coupled to determine multicast routes utilizing a plurality of network interfaces and store the multicast routes in the MRIB; and
   table management logic responsive to multicast routing information obtained from the MRIB, the routing protocol logic, and the plurality of network interfaces, the table management logic programmed to associate with each forwarding state a source address range encompassing at least one source address, wherein a forwarding state having a source address range encompassing all possible source addresses is a default forwarding state and a forwarding state having a source address range encompassing fewer than all possible source addresses is a non-default forwarding state, and to maintain the forwarding states such that the source address ranges for all non-default forwarding states are non-overlapping.

94. The program product of claim 93, wherein maintaining the forwarding states such that the source address ranges for all non-default forwarding states are non-overlapping comprises:
   detecting a multicast route change;
   locating in the forwarding table a forwarding state having a source address range that is contained in the changed multicast route;
   searching in the MRIB to find an enclosing range for S, said enclosing range representing a matching range containing a number of more-specific enclosing ranges; and
   updating the inbound and outbound interfaces for the forwarding state, if S is not contained in one of the number of more-specific enclosing ranges other than the changed multicast route and the changed multicast route causes the inbound interface for the forwarding state to change from an old inbound interface to a new inbound interface.

95. The program product of claim 93, wherein maintaining the forwarding states such that the source address ranges for all non-default forwarding states are non-overlapping comprises:
   determining a multicast route to be aged;
   searching in the MRIB to find a first enclosing range that contains the aged multicast route;
   locating in the forwarding table a forwarding state having a source address range that is contained in the aged multicast route;
   searching in the MRIB to find a second enclosing range that contains S, said second enclosing range representing a matching range containing a number of more-specific enclosing ranges; and
   updating the inbound and outbound interfaces for the forwarding state, if S is not contained in a more-specific enclosing range within the matching range other than the aged multicast route, the first enclosing range that contains the aged multicast route exists, and the aged multicast route causes the inbound interface of the forwarding state to change from an old inbound interface to a new inbound interface.

96. The program product of claim 93, wherein maintaining the forwarding states such that the source address ranges for all non-default forwarding states are non-overlapping comprises:
   receiving a multicast packet for (S,G) from one of the plurality of network interfaces;
   installing in the forwarding table a transitional most-specific forwarding state having a source address range encompassing only S;
   determining all inbound and outbound interfaces for the transitional most-specific forwarding state; and
   updating the transitional most-specific forwarding state to use a less-specific source address range, if all inbound and outbound interfaces agree to use the less-specific source address range.

97. The program product of claim 93, wherein associating a source address range with a forwarding state comprises assigning a prefix to the forwarding state, the source address S and the prefix together defining the source address range for the forwarding state, such that a forwarding state having a prefix of zero (0) is a default forwarding state having a source address range encompassing all possible source addresses, and a forwarding state having a prefix greater than zero (0) is a non-default forwarding state having a source address range encompassing fewer than all possible source addresses.

* * * * *